(12) United States Patent
Kuriakose et al.

(10) Patent No.: US 9,749,175 B2
(45) Date of Patent: Aug. 29, 2017

(54) TCP CONNECTION RELOCATION

(71) Applicant: Brocade Communications Systems, Inc., San Jose, CA (US)

(72) Inventors: Poulo Kuriakose, Cupertino, CA (US); Amr Sabaa, Sunnyvale, CA (US); Ryan Hegland, Champlin, MN (US); Andy Dooley, Rogers, MN (US); Siva Adiraju, Fremont, CA (US); Amar Vutukuru, San Jose, CA (US); Hiren Desai, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 977 days.

(21) Appl. No.: 13/677,909

(22) Filed: Nov. 15, 2012

(65) Prior Publication Data

US 2013/0318246 A1 Nov. 28, 2013

Related U.S. Application Data

(60) Provisional application No. 61/567,285, filed on Dec. 6, 2011.

(51) Int. Cl.
*G06F 15/16* (2006.01)
*H04L 29/08* (2006.01)
(Continued)

(52) U.S. Cl.
CPC ...... *H04L 29/08576* (2013.01); *H04L 67/141* (2013.01); *H04L 67/148* (2013.01); *H04L 67/2876* (2013.01); *H04L 69/14* (2013.01); *H04L 69/16* (2013.01); *H04L 45/24* (2013.01); *H04L 45/66* (2013.01)

(58) Field of Classification Search
CPC ..... H04L 67/141; H04L 67/148; H04L 69/16; H04L 29/08; H04L 29/08576
See application file for complete search history.

(56) References Cited

U.S. PATENT DOCUMENTS 8,750,304 B2 * 6/2014 Ramasamy et al. ......... 370/392
2002/0040402 A1 * 4/2002 Levy-Abegnoli et al. ... 709/229
(Continued)

OTHER PUBLICATIONS

Almesberger, Werner, "TCP Connection Passing," Proceedings of the Linux Symposium, vol. One, pp. 9-21, Ottawa, Canada, Jul. 21-24, 2004.

*Primary Examiner* — Cheikh Ndiaye
(74) *Attorney, Agent, or Firm* — Blank Rome, LLP

(57) ABSTRACT

In a network where there are two local area networks (LANs) connected over a wide area network (WAN) by paralleled LAN to WAN devices at each end of the WAN, Transmission Control Protocol (TCP) connections may be requested by a first near end LAN to WAN device and received at a first far end LAN to WAN device but the acknowledgement may be returned to a second far end LAN to WAN device. The second far end LAN to WAN device contacts the first far end LAN to WAN device and the TCP connection is moved to the second far end LAN to WAN device, which provides the acknowledgement to the first near end LAN to WAN device to complete the TCP connection. Similar operations occur during active TCP connection operation but with certain queued data being flushed during the TCP connection transfer.

24 Claims, 17 Drawing Sheets

(51) Int. Cl.
*H04L 29/06* (2006.01)
*H04L 12/707* (2013.01)
*H04L 12/721* (2013.01)

(56) References Cited

U.S. PATENT DOCUMENTS

| | | | |
|---|---|---|---|
| 2002/0143954 A1* | 10/2002 | Aiken et al. | 709/227 |
| 2003/0014684 A1* | 1/2003 | Kashyap | 714/4 |
| 2011/0255537 A1* | 10/2011 | Ramasamy et al. | 370/392 |
| 2012/0158976 A1* | 6/2012 | Van Der Merwe et al. | 709/228 |

* cited by examiner

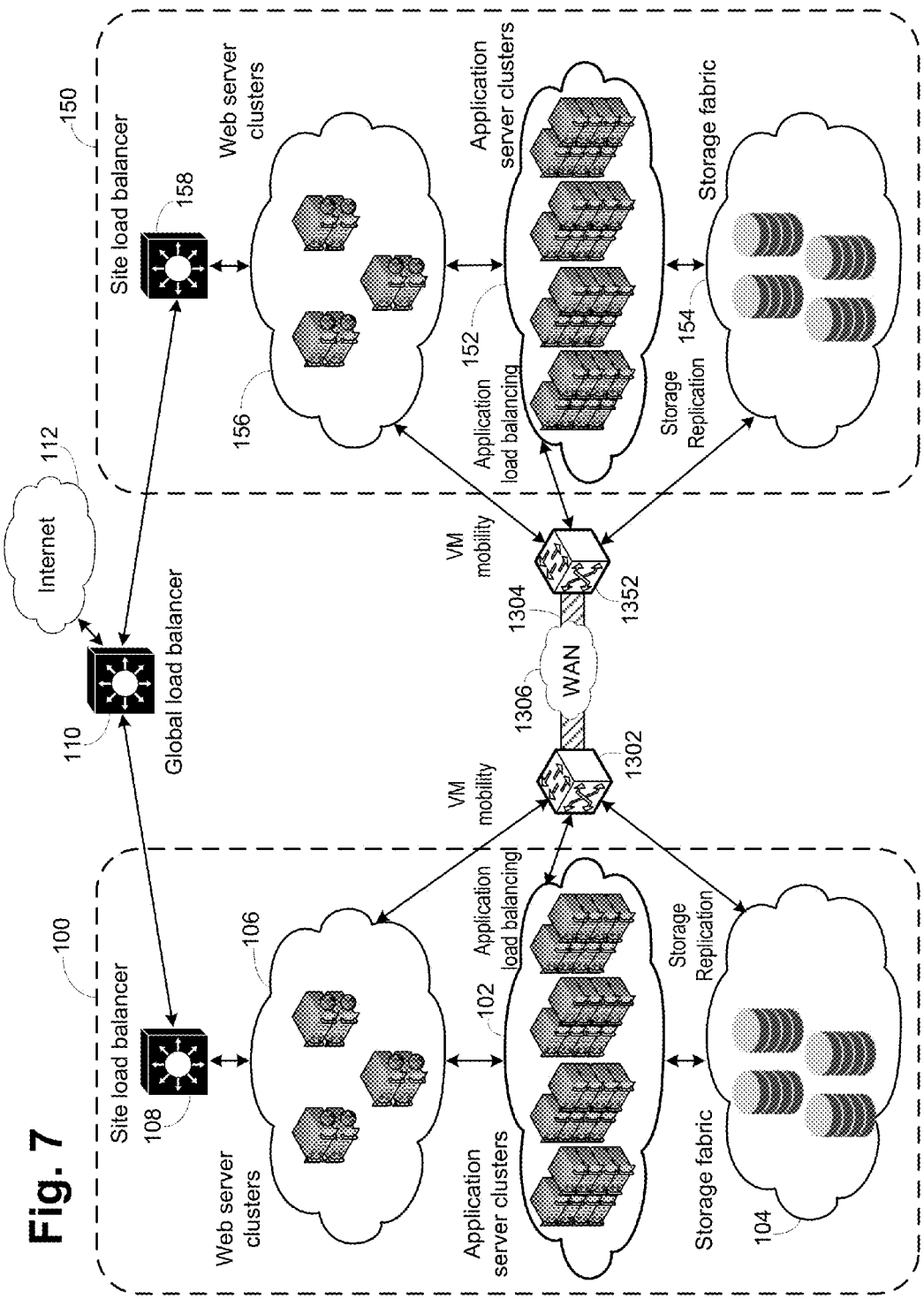

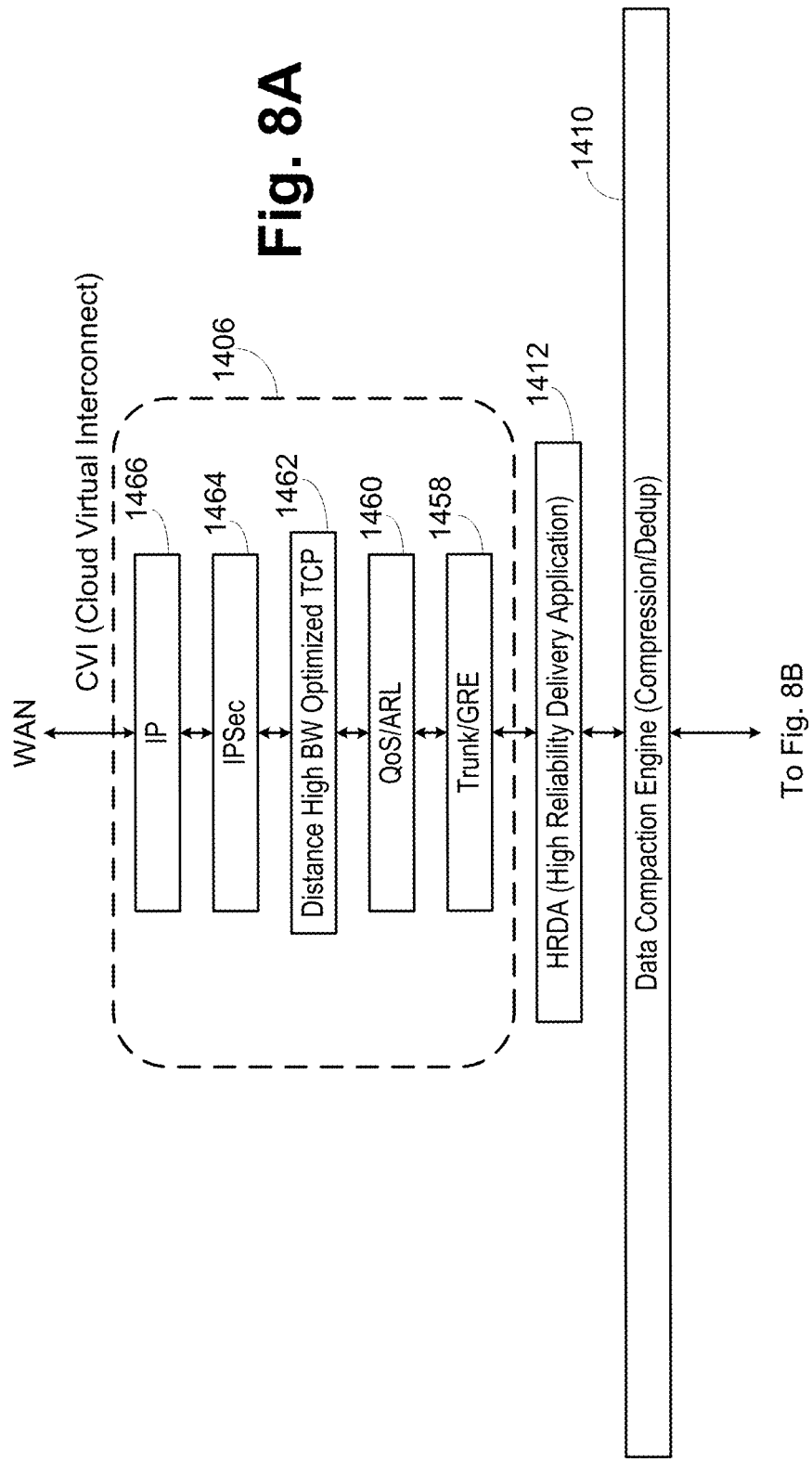

TCP CONNECTION RELOCATION

CROSS REFERENCE TO RELATED APPLICATIONS

This application claims the benefit under 35 U.S.C. §119 (e) of U.S. Provisional Patent Application Ser. No. 61/567, 285 entitled "TCP CONNECTION RELOCATION," filed Dec. 6, 2011, which is hereby incorporated by reference.

This application is also related to U.S. patent application Ser. No. 13/677,929, entitled "Lossless Connection Failover for Single Devices,"; Ser. No. 13/677,922, entitled "Lossless Connection Failover for Mirrored Devices,"; and Ser. No. 13/678,032, entitled "Flow-Based TCP," all filed concurrently herewith, which are hereby incorporated by reference.

BACKGROUND OF THE INVENTION

1. Field of the Invention

The invention relates to networking, and more particularly to redundant links and devices.

2. Description of the Related Art

In a high availability (HA) environment, it is common to have parallel devices at each data center to allow for rerouting in cases of device or link failure. It is common to use load balancing techniques when there are multiple paths between two data centers, as would occur when there are parallel devices at each data center. Similarly, load balancing is often done within the data center to provide more uniform loading of devices in a given class or function. This can result in routing problems if Transmission Control Protocol (TCP) connections are made at a particular device and then the load balancing changes the routing so that a different device at the data center receives at least portions of the succeeding transmissions. Either the TCP context is not present or significant forwarding between devices must occur.

SUMMARY OF THE INVENTION

TCP connections are moved between parallel devices and links during either connection setup or during active operation.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

FIG. 7 is a block diagram of the data centers of FIG. 1 modified to operate according to aspects of the present invention.

FIGS. 8A and 8B are block diagrams of the functional blocks of the LDCM appliance of FIG. 6.

DETAILED DESCRIPTION OF THE PREFERRED EMBODIMENTS

Figure 1:
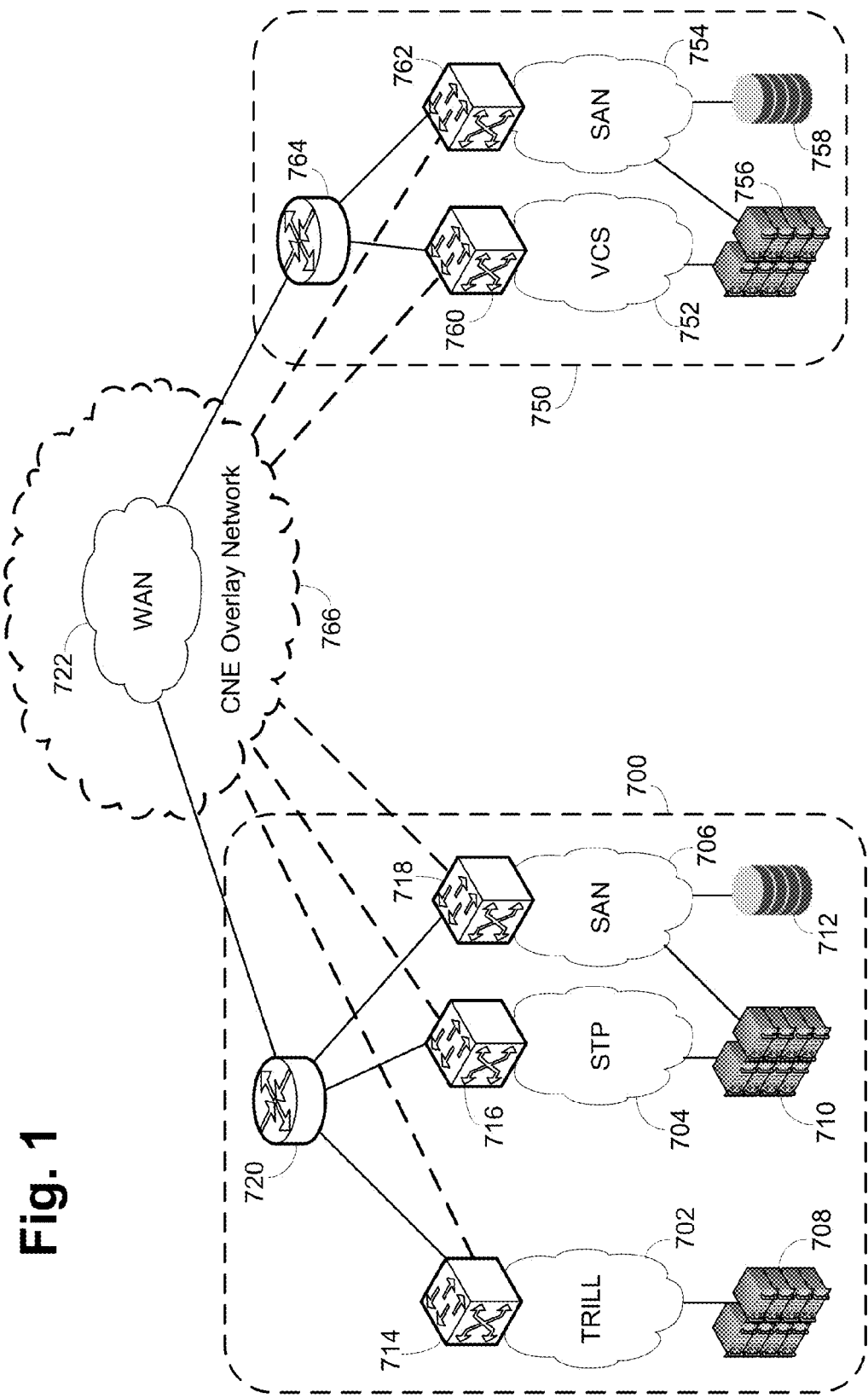
FIG. 1 is a block diagram of an embodiment of two connected data centers according to the present invention.

Referring to FIG. 1, a network illustrating portions according to the present invention is shown. A first data center 700 is shown having three separate internal networks, a Transparent Interconnection of Lots of Links (TRILL), network 702, a normal Ethernet spanning tree protocol (STP) network 704 and a storage area network (SAN) 706. Application servers 708 are connected to the TRILL network 702, while application servers 710 are connected to the STP network 704 and the SAN 706. Storage 712 is shown connected to the SAN 706. Each of the networks 702, 704 and 706 has a converged network extension (CNE) device 714, 716, 718 connected. The CNE devices 714, 716, 718 are connected to a router 720, which in turn is connected to a WAN 722. A second data center 750 is similar, having a VCS Ethernet fabric network 752 and a SAN 754. Application servers 756 are connected to each network 752 and 754, with storage connected to the SAN 754. CNE devices 760, 762 are connected to each network 752, 754 and to a router 764, which is also connected to the WAN 722 to allow the data centers 700, 750 to communicate. The operation of the CNE devices 714-718 and 760-762 result in an effective CNE overlay network 766, with virtual links from each CNE device to the CNE overlay network 766.

One goal of the embodiments of the present invention is to extend a Virtual Cluster Switch (VCS) and TRILL network across data centers and meet the scalability requirements needed by the deployments. A CNE device can be implemented in a two-box solution, wherein one box is capable of layer 2/layer 3/Fibre Channel over Ethernet (L2/L3/FCoE) switching and is part of the VCS, and the other facilitates the WAN tunneling to transport Ethernet and/or Fibre Channel (FC) traffic over WAN. The CNE device can also be implemented in a one-box solution, wherein a single piece of network equipment combines the functions of L2/L3/FCoE switching and WAN tunneling.

VCS as a layer-2 switch uses TRILL as its inter-switch connectivity and delivers a notion of single logical layer-2 switch. This single logical layer-2 switch delivers a transparent LAN service. All the edge ports of VCS support standard protocols and features like Link Aggregation Control Protocol (LACP), Link Layer Discovery Protocol (LLDP), virtual LANs (VLANs), media access control (MAC) learning, etc. VCS achieves a distributed MAC address database using Ethernet Name Service (eNS) and attempts to avoid flooding as much as possible. VCS also provides various intelligent services, such as virtual link aggregation group (vLAG), advance port profile management (APPM), End-to-End FCoE, Edge-Loop-Detection, etc. More details on VCS are available in U.S. patent application Ser. No. 13/098,360, entitled "Converged Network Extension," filed Apr. 29, 2011; Ser. No. 12/725,249, entitled "Redundant Host Connection in a Routed Network," filed 16 Mar. 2010; Ser. No. 13/087,239, entitled "Virtual Cluster Switching," filed 14 Apr. 2011; Ser. No. 13/092,724, entitled "Fabric Formation for Virtual Cluster Switching," filed 22 Apr. 2011; Ser. No. 13/092,580, entitled "Distributed Configuration Management for Virtual Cluster Switching," filed 22 Apr. 2011; Ser. No. 13/042,259, entitled "Port Profile Management for Virtual Cluster Switching," filed 7 Mar. 2011; Ser. No. 13/092,460, entitled "Advanced Link Tracking for Virtual Cluster Switching," filed 22 Apr. 2011; Ser. No. 13/092,701, entitled "Virtual Port Grouping for Virtual Cluster Switching," filed 22 Apr. 2011; Ser. No. 13/092,752, entitled "Name Services for Virtual Cluster Switching," filed 22 Apr. 2011; Ser. No. 13/092,877, entitled "Traffic Management for Virtual Cluster Switching," filed 22 Apr. 2011; and Ser. No. 13/092,864, entitled "Method and System for Link Aggregation Across Multiple Switches," filed 22 Apr. 2011, all hereby incorporated by reference.

In embodiments of the present invention, for the purpose of cross-data-center communication, each data center is represented as a single logical RBridge. This logical RBridge can be assigned a virtual RBridge ID or use the RBridge ID of the CNE device that performs the WAN tunneling.

Figure 2:
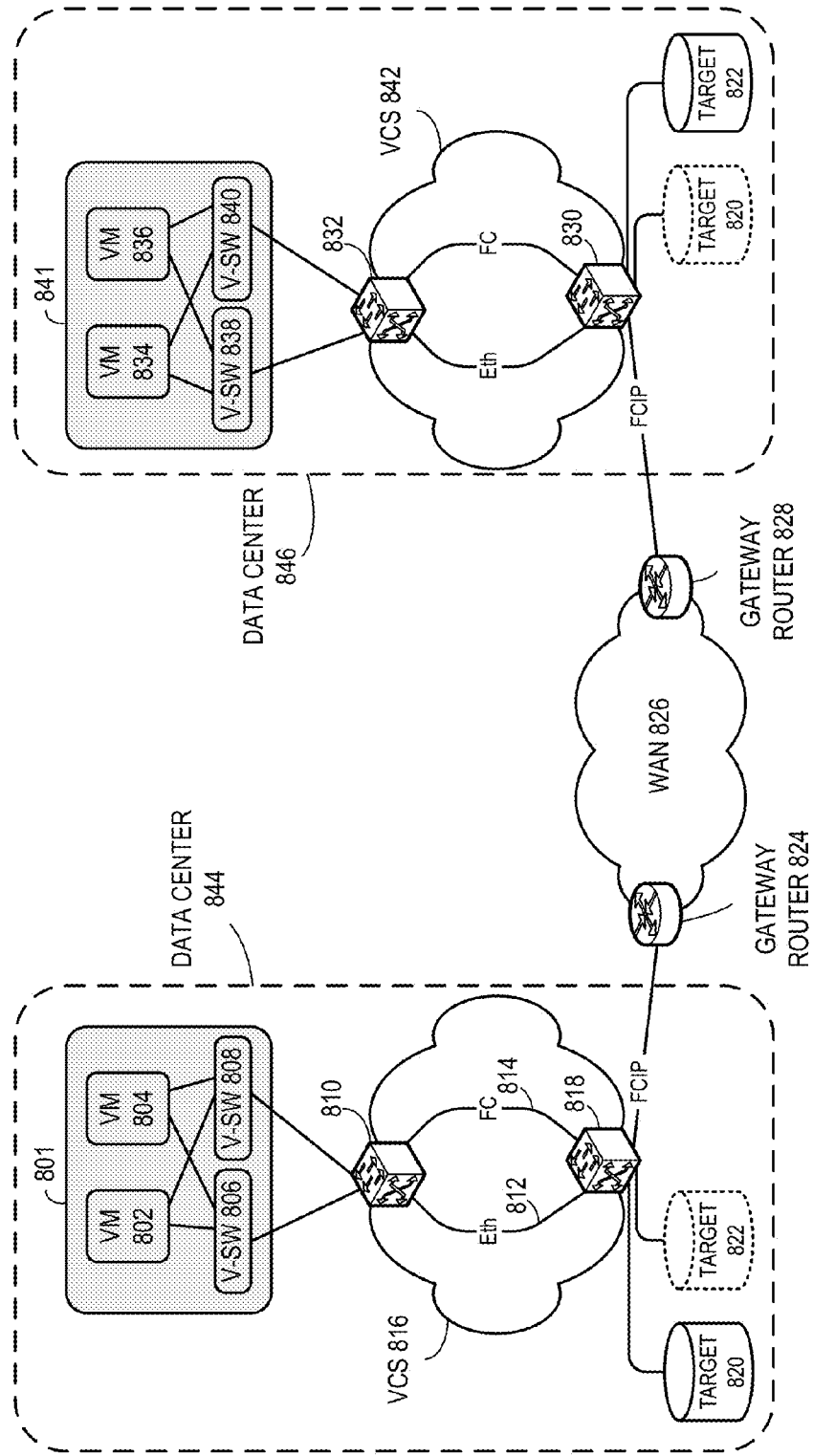
FIG. 2 illustrates an exemplary network architecture which includes CNE devices to facilitate cross-data-center communications, in accordance with one embodiment of the present invention.

FIG. 2 illustrates an exemplary network architecture which includes CNE devices for facilitate cross-data-center communications, in accordance with one embodiment of the present invention. In this example, two data centers 844 and 846 are coupled to a WAN 826 via gateway routers 824 and 828, respectively. Data center 844 includes a VCS 816, which couples to a number of hosts, such as host 801, via its member switches, such as switch 810. Host 801 includes two VMs 802 and 804, which are coupled to virtual switches 806 and 808 in a dual-homing configuration. In one embodiment, virtual switches 806 and 808 reside on two network interface cards on host 801. Virtual switches 806 and 808 are coupled to VCS member switch 810. Also included in VCS 816 is a CNE device 818. CNE device 818 is configured to receive both Ethernet (or TRILL) traffic from member switch 810 via an Ethernet (or TRILL) link 812, and FC traffic via FC link 814. Also coupled to CNE device 818 is a target storage device 820, and a cloned target storage device 822 (denoted by dotted lines). CNE device 818 maintains a Fibre Channel over IP (FCIP) tunnel to data center 846 across WAN 826 via gateway routers 824 and 828.

Similarly, data center 846 includes a VCS 842, which in turn includes a member switch 832. Member switch 832 is coupled to a host 841, which includes virtual machines (VMs) 834 and 836, both of which are coupled to virtual switches 838 and 840. Also included in VCS 842 is a CNE device 830. CNE device is coupled to member switch 832 via an Ethernet (TRILL) link and an FC link. CNE device 830 is also coupled to target storage device 822 and a clone of target storage device 820.

During operation, assume that VM 802 needs to move from host 801 to host 841. Note that this movement is previously not possible, because virtual machines are visible only within the same layer-2 network domain. Once the layer-2 network domain is terminated by a layer-3 device, such as gateway router 824, all the identifying information for a particular virtual machine (which is carried in layer-2 headers) is lost. However, in embodiments of the present invention, because CNE device extends the layer-2 domain from VCS 816 to VCS 842, the movement of VM 802 from data center 844 to data center 846 is now possible as that fundamental requirement is met.

When forwarding TRILL frames from data center 844 to data center 846, CNE device 818 modifies the egress TRILL frames' header so that the destination RBridge identifier is the RBridge identifier assigned to data center 846. CNE device 818 then uses the FCIP tunnel to deliver these TRILL frames to CNE device 830, which in turn forwards these TRILL frames to their respective layer-2 destinations.

VCS uses FC control plane to automatically form a fabric and assign RBridge identifiers to each member switch. In one embodiment, the CNE architecture keeps the TRILL and storage area network (SAN) fabrics separate between data centers. From a TRILL point of view, each VCS (which corresponds to a respective data center) is represented as a single virtual RBridge. In addition, the CNE device can be coupled to a VCS member switch with both a TRILL link and an FC link. The CNE device can join the VCS via a TRILL link. However, since the CNE devices keeps the TRILL VCS fabric and SAN (FC) fabric separate, the FC link between the CNE device and the member switch is configured for FC multi-fabric.

Figure 3:
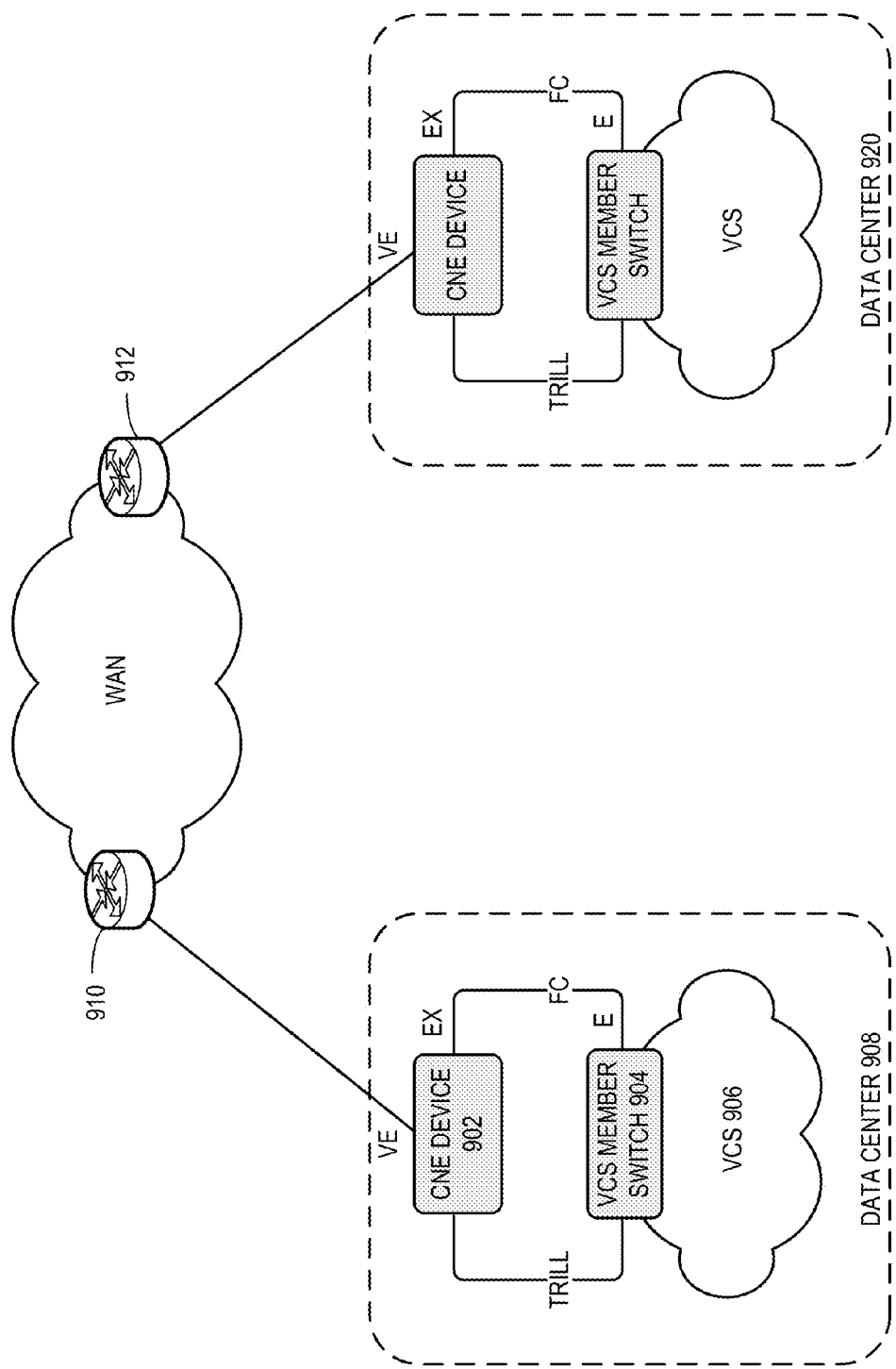
FIG. 3 illustrates an exemplary implementation of CNE-enabled VCSs, in accordance with one embodiment of the present invention.

As illustrated in FIG. 3, a data center 908 is coupled to a WAN via a gateway router 910, and a data center 920 is coupled to the WAN via a gateway router 912. Data center 908 includes a VCS 906, which includes a member switch 904. Also included in data center 908 is a CNE device 902. CNE device 902 is coupled to VCS member switch 904 via a TRILL link and an FC link. CNE device 902 can join the VCS via the TRILL link. However, the FC link allows CNE device 902 to maintain a separate FC fabric with VCS member switch 904 to carry FC traffic. In one embodiment, the FC port on CNE device 902 is an FC EX_port. The corresponding port on member switch 904 is an FC E_port. The port on CNE device 902 on the WAN side (coupling to gateway router 910) is an FCIP VE_port. Data center 920 has a similar configuration.

In one embodiment, each data center's VCS includes a node designated as the ROOT RBridge for multicast purposes. During the initial setup, the CNE devices in the VCSs exchange each VCS's ROOT RBridge identifier. In addition, the CNE devices also exchange each data center's RBridge identifier. Note that this RBridge identifier represents the entire data center. Information related to data-center RBridge identifiers is distributed as a static route to all the nodes in the local VCS.

Figure 4A:
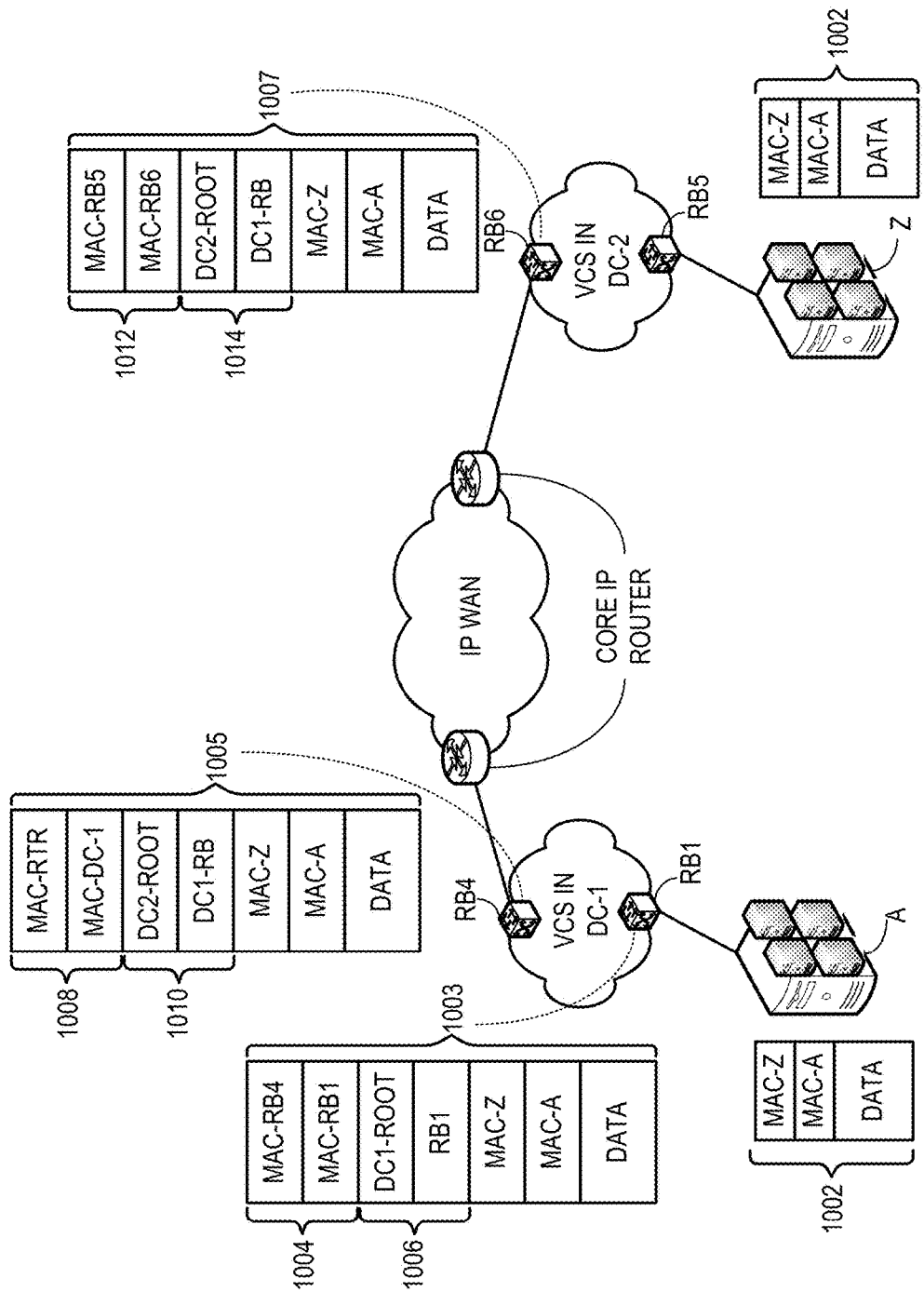
FIG. 4A presents a diagram illustrating how CNE devices handle broadcast, unknown unicast, and multicast (BUM) traffic across data centers, in accordance with one embodiment of the present invention.

FIG. 4A presents a diagram illustrating how CNE devices handle broadcast, unknown unicast, and multicast (BUM) traffic across data centers, in accordance with one embodiment of the present invention. In this example, two data centers, DC-1 and DC-2, are coupled to an IP WAN via core IP routers. The CNE device in DC-1 has an RBridge identifier of RB4, and the CNE device in DC-2 has an RBridge identifier of RB6. Furthermore, in the VCS in DC-1, a member switch RB1 is coupled to host A. In the VCS in DC-2, a member switch RB5 is coupled to host Z.

Assume that host A needs to send multicast traffic to host Z, and that host A already has the knowledge of host Z's MAC address. During operation, host A assembles an Ethernet frame 1002, which has host Z's MAC address (denoted as MAC-Z) as its destination address (DA), and host A's MAC address (denoted as MAC-A) as its source address (SA). Based on frame 1002, member switch RB1 assembles a TRILL frame 1003, whose TRILL header 1006 includes the RBridge identifier of data center DC-1's root RBridge (denoted as "DC1-ROOT") as the destination RBridge, and RB1 as the source RBridge. (That is, within DC-1, the multicast traffic is distributed on the local multicast tree.) The outer Ethernet header 1004 of frame 1003 has CNE device RB4's MAC address (denoted as MAC-RB4) as the DA, and member switch RB1's MAC address (denoted as MAC-RB1) as the SA.

When frame 1003 reaches CNE device RB4, it further modifies the frame's TRILL header to produce frame 1005. CNE device RB4 replaces the destination RBridge identifier in the TRILL header 1010 with data center DC-2's root RBridge identifier DC2-ROOT. The source RBridge identifier is changed to data center DC-1's virtual RBridge identifier, DC1-RB (which allows data center DC-2 to learn data center DC-1's RBridge identifier). Outer Ethernet header 1008 has the core router's MAC address (MAC-RTR) as its DA, and CNE device RB4's MAC address (MAC-DC-1) as its SA.

Frame 1005 is subsequently transported across the IP WAN in an FCIP tunnel and reaches CNE device RB6. Correspondingly, CNE device RB6 updates the header to produce frame 1007. Frame 1007's TRILL header 1014 remains the same as frame 1005. The outer Ethernet header 1012 now has member switch RB5's MAC address, MAC-RB5, as its DA, and CNE device RB6's MAC address, MAC-RB6, as its SA. Once frame 1007 reaches member switch RB5, the TRILL header is removed, and the inner Ethernet frame is delivered to host Z.

In various embodiments, a CNE device can be configured to allow or disallow unknown unicast, broadcast (e.g., Address Resolution Protocol (ARP)), or multicast (e.g., Internet Group Management Protocol (IGMP) snooped) traffic to cross data center boundaries. By having these options, one can limit the amount of BUM traffic across data centers. Note that all TRILL encapsulated BUM traffic between data centers can be sent with the remote data center's root RBridge identifier. This translation is done at the terminating point of the FCIP tunnel.

Additional mechanisms can be implemented to minimize BUM traffic across data centers. For instance, the TRILL ports between the CNE device and any VCS member switch can be configured to not participate in any of the VLAN multicast group IDs (MGIDs). In addition, the eNS on both VCSs can be configured to synchronize their learned MAC address database to minimize traffic with unknown MAC DA. (Note that in one embodiment, before the learned MAC address databases are synchronized in different VCSs, frames with unknown MAC DAs are flooded within the local data center only.)

To further minimize BUM traffic, broadcast traffic such as ARP traffic can be reduced by snooping ARP responses to build ARP databases on VCS member switches. The learned ARP databases are then exchanged and synchronized across different data centers using eNS. Proxy-based ARP is used to respond to all know ARP requests in a VCS. Furthermore, multicast traffic across data centers can be reduced by distributing the multicast group membership across data canters by sharing the IGMP snooping information via eNS.

The process of forwarding unicast traffic between data centers is described as follows. During the FCIP tunnel formation, the logical RBridge identifiers representing data centers are exchanged. When a TRILL frame arrives at the entry node of the FCIP tunnel, wherein the TRILL destination RBridge is set as the RBridge identifier of the remote data center, the source RBridge in the TRILL header is translated to the logical RBridge identifier assigned to the local data center. When the frame exits the FCIP tunnel, the destination RBridge field in the TRILL header is set as the local (i.e., the destination) data center's virtual RBridge identifier. The MAC DA and VLAN ID in the inner Ethernet header is then used to look up the corresponding destination RBridge (i.e., the RBridge identifier of the member switch to which the destination host is attached, and the destination RBridge field in the TRILL header is updated accordingly.

In the destination data center, based on an ingress frame, all the VCS member switches learn the mapping between the MAC SA (in the inner Ethernet header of the frame) and the TRILL source RBridge (which is the virtual RBridge identifier assigned to the source data center). This allows future egress frames destined to that MAC address to be sent to the right remote data center. Note that since the RBridge identifier assigned to a given data center does not correspond to a physical RBridge, in one embodiment, a static route is used to map a remote data-center RBridge identifier to the local CNE device.

Figure 4B:
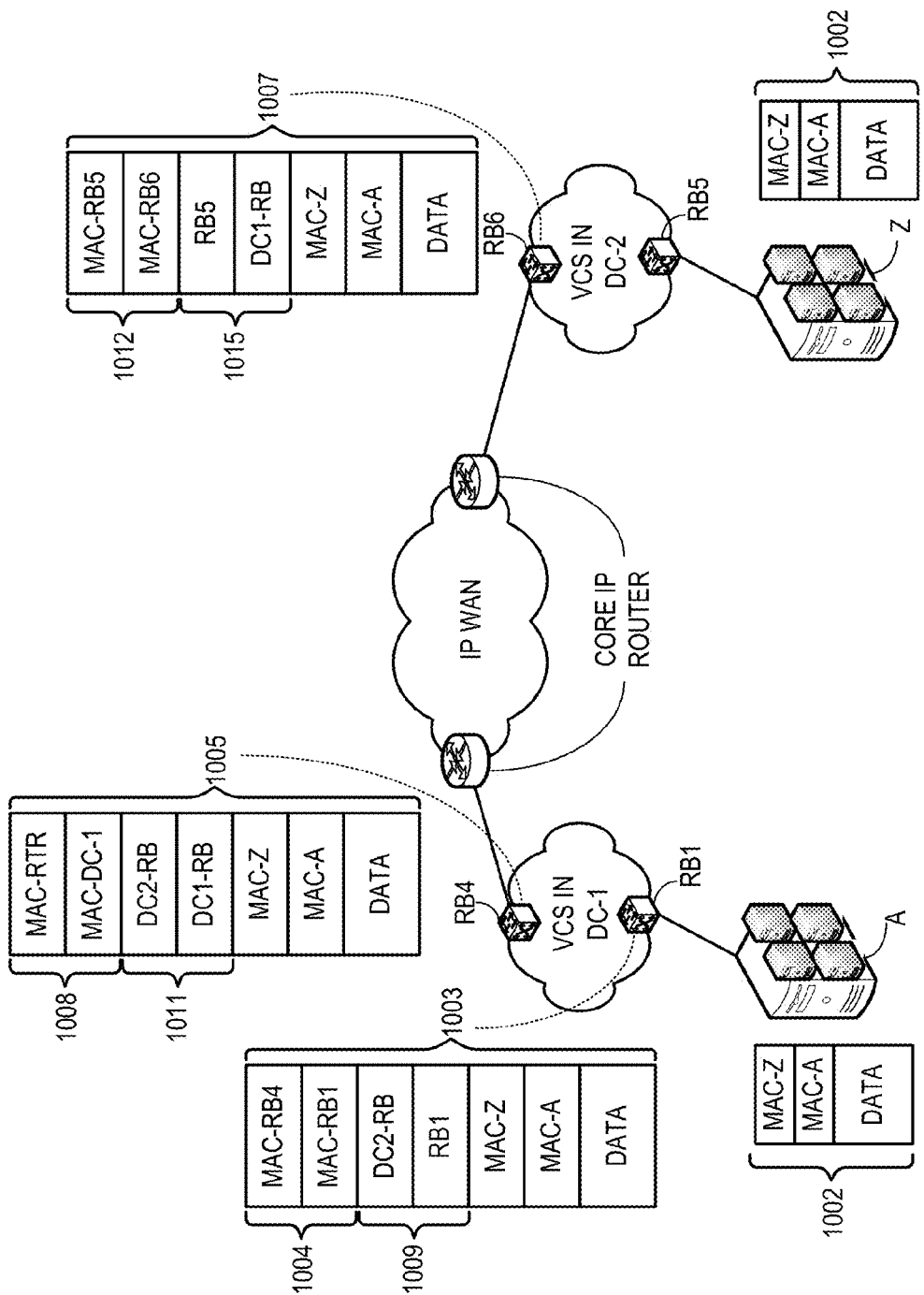
FIG. 4B presents a diagram illustrating how CNE devices handle unicast traffic across data centers, in accordance with one embodiment of the present invention.

FIG. 4B presents a diagram illustrating how CNE devices handle unicast traffic across data centers, in accordance with one embodiment of the present invention. Assume that host A needs to send unicast traffic to host Z, and that host A already has the knowledge of host Z's MAC address. During operation, host A assembles an Ethernet frame 1002, which has host Z's MAC address (MAC-Z) as its DA, and host A's MAC address (MAC-A) as its SA. Based on frame 1002, member switch RB1 assembles a TRILL frame 1003, whose TRILL header 1009 includes the RBridge identifier of data center DC-2's virtual Rbridge (denoted as "DC2-RB") as the destination RBridge, and RB1 as the source RBridge. The outer Ethernet header 1004 of frame 1003 has CNE device RB4's MAC address (MAC-RB4) as the DA, and member switch RB1's MAC address (MAC-RB1) as the SA.

When frame 1003 reaches CNE device RB4, it further modifies the frame's TRILL header to produce frame 1005. CNE device RB4 replaces the source RBridge identifier in the TRILL header ion with data center DC-1's virtual RBridge identifier DC1-RB (which allows data center DC-2 to learn data center DC-1's RBridge identifier). Outer Ethernet header 1008 has the core router's MAC address (MAC-RTR) as its DA, and CNE device RB4's MAC address (MAC-DC-1) as its SA.

Frame 1005 is subsequently transported across the IP WAN in an FCIP tunnel and reaches CNE device RB6. Correspondingly, CNE device RB6 updates the header to produce frame 1007. Frame 1007's TRILL header 1015 has an updated destination RBridge identifier, which is RB5, the VCS member switch in DC-2 that couples to host Z. The outer Ethernet header 1012 now has member switch RB5's MAC address, MAC-RB5, as its DA, and CNE device RB6's MAC address, MAC-RB6, as its SA. Once frame 1007 reaches member switch RB5, the TRILL header is removed, and the inner Ethernet frame is delivered to host Z.

Flooding across data centers of frames with unknown MAC DAs is one way for the data centers to learn the MAC address in another data center. All unknown SAs are learned as MACs behind an RBridge and it is no exception for the CNE device. In one embodiment, eNS can be used to distribute learned MAC address database, which reduces the amount of flooding across data centers.

In order to optimize flushes, even though MAC addresses are learned behind RBridges, the actual VCS edge port associated with a MAC address is present in the eNS MAC updates. However, the edge port IDs might no longer be unique across data-centers. To resolve this problem, all eNS updates across data centers will qualify the MAC entry with the data-center's RBridge identifier. This configuration allows propagation of port flushes across data centers.

In the architecture described herein, VCSs in different data-centers do not join each other; hence the distributed configurations are kept separate. However, in order to allow virtual machines to move across data-centers, there will be some configuration data that needs to be synchronized across data-centers. In one embodiment, a special module (in either software or hardware) is created for CNE purposes. This module is configured to retrieve the configuration information needed to facilitate moving of virtual machines across data centers and it is synchronized between two or more VCSs.

In one embodiment, the learned MAC address databases are distributed across data centers. Also, edge port state change notifications (SCNs) are also distributed across data centers. When a physical RBridge is going down, the SCN is converted to multiple port SCNs on the inter-data-center FCIP link.

In order to protect the inter-data-center connectivity, a VCS can form a vLAG between two or more CNE devices. In this model, the vLAG RBridge identifier is used as the data-center RBridge identifier. The FCIP control plane is configured to be aware of this arrangement and exchange the vLAG RBridge identifiers in such cases.

Figure 5:
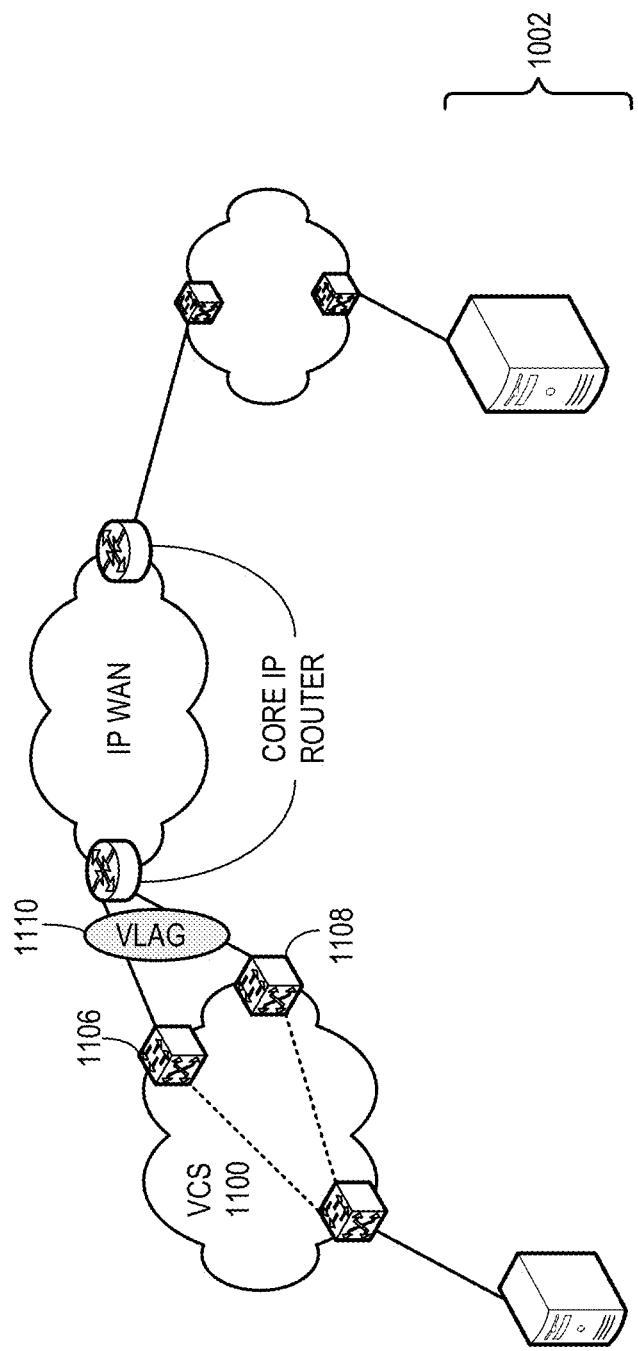
FIG. 5 illustrates an example where two CNE devices are used to construct a vLAG, in accordance with an embodiment of the present invention.

FIG. 5 illustrates an example where two CNE devices are used to construct a vLAG, in accordance with an embodiment of the present invention. In this example, a VCS 1100 includes two CNE devices 1106 and 1108. Both CNE devices 1106 and 1108 forms a vLAG 1110 which is coupled to a core IP router. vLAG 1110 is assigned a virtual RBridge identifier, which is also used as the data-center RBridge identifier for VCS 1100. Furthermore, vLAG 1110 can facilitate both ingress and egress load balancing (e.g., based on equal-cost multi-pathing (ECMP)) for any member switch within VCS 1100.

Figure 6:
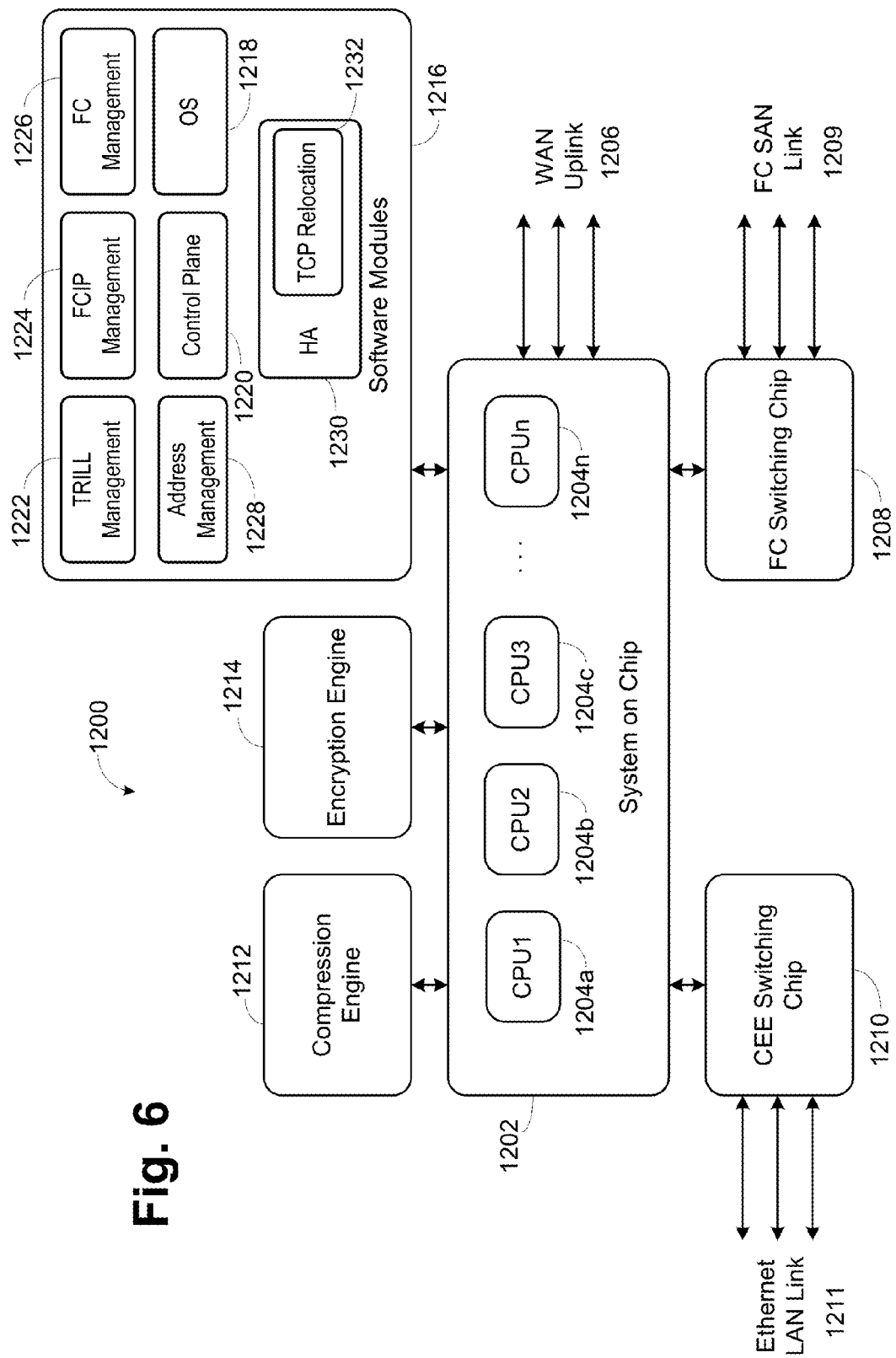
FIG. 6 is a block diagram of an embodiment of an LDCM appliance according to the present invention.

FIG. 6 illustrates a CNE/LDCM device 1200, the LDCM features preferably being added to a CNE device to create a single device. A system on chip (SOC) 1202 provides the primary processing capabilities, having a plurality of CPUs 1204. A number of Ethernet connections 1206 are preferably included on the SOC 1202 to act as the WAN link, though a separate Ethernet device could be used if desired. An FC switching chip 1208 is connected to the SOC 1202 to provide connections to FC SANs. A Converged Enhanced Ethernet (CEE) switching chip 1210 is connected to the SOC 1202 to allow attachment to the VCS or to an Ethernet LAN. A compression engine 1212 is provided with the SOC 1202 to provide compression and dedup capabilities to reduce traffic over the WAN links. An encryption engine 1214 is provided for security purposes, as preferably the FLIP tunnel is encrypted for security.

Various software modules 1216 are present in a memory in the CNE/LDCM device 1200. These include an underlying operating system 1218, a control plane module 1220 to manage interaction with the VCS, a TRILL management module 1222 for TRILL functions above the control plane, an FCIP management module 1224 to manage the FCIP tunnels over the WAN, an FC management module 1226 to interact with the FC SAN and an address management module 1228. An additional module is a high availability (HA) module 1230, which in turn includes a TCP relocation submodule 1232. The software in the TCP relocation submodule 1232 is executed in the CPUs 1204 to perform the TCP relocation operations described below relating to FIGS. 12-15.

FIG. 7 illustrates data centers with the addition of CNE/LDCM devices 1302, 1352. Two data centers 100, 150 are illustrated. Each has a series of application server clusters 102, 152 which execute the actual applications, such as in a SaaS (software as a Service) architecture. Data is stored in a storage fabric 104, 154. Access to the application server clusters 102, 152 is shown as being through web server clusters 106, 156, though more direct access at the LAN layer is common. A site load balancer 108, 158 distributes incoming requests across the web servers in the web server clusters 106, 156. A global load balancer no is connected to the Internet 112 to balance load between the data centers 100, 150. The CNE/LDCM devices 1302 and 1352 create a cloud virtual interconnect (CVI) 1304 between themselves, effectively an FCIP tunnel through the WAN 1306. The CVI 1304 is used for VM mobility, application load balancing and storage replication between the data centers 100, 150.

The cloud virtual interconnect 1304 preferably includes the following components. An FCIP trunk, as more fully described in U.S. patent application Ser. No. 12/880,495, entitled "FCIP Communications with Load Sharing and Failover", filed Sep. 13, 2010, which is hereby incorporated by reference, aggregates multiple TCP connections to support wide WAN bandwidth ranges from 100 Mbps up to 20 Gbps. It also supports multi-homing and enables transparent failover between redundant network paths.

Adaptive rate limiting (ARL) is performed on the TCP connections to change the rate at which data is transmitted through the TCP connections. ARL uses the information from the TCP connections to determine and adjust the rate limit for the TCP connections dynamically. This will allow the TCP connections to utilize the maximum available bandwidth. It also provides a flexible number of priorities for defining policies and the users are provisioned to define the priorities needed.

High bandwidth TCP (HBTCP) is designed to be used for high throughput applications, such as virtual machine and storage migration, over long fat networks. It overcomes the challenge of the negative effect of traditional TCP/IP in WAN. In order to optimize the performance the following changes have been made.

1) Scaled Windows: In HBTCP, scaled windows are used to support WAN latencies of up to 350 ms or more. Maximum consumable memory will be allocated per session to maintain the line rate.

2) Optimized reorder resistance: HBTCP has more resistance to duplicate acknowledgements and requires more duplicate ACK's to trigger the fast retransmit.

3) Optimized fast recovery: In HBTCP, instead of reducing the cwnd by half, it is reduced by substantially less than 50% in order to make provision for the cases where extensive network reordering is done.

4) Quick Start: The slow start phase is modified to quick start where the initial throughput is set to a substantial value and throughput is only minimally reduced when compared to the throughput before the congestion event.

5) Congestion Avoidance: By carefully matching the amount of data sent to the network speed, congestion is avoided instead of pumping more traffic and causing a congestion event so that congestion avoidance can be disabled.

6) Optimized slow recovery: The retransmission timer in HBTCP (150 ms) expires much quicker than in traditional TCP and is used when fast retransmit cannot provide recovery. This triggers the slow start phase earlier when a congestion event occurs.

7) Lost packet continuous retry: Instead of waiting on an ACK for a SACK retransmitted packet, continuously retransmit the packet to improve the slow recovery, as described in more detail in U.S. patent application Ser. No. 12/972,713, entitled "Repeated Lost Packet Retransmission in a TCP/IP Network", filed Dec. 20, 2010, which is hereby incorporated by reference.

The vMotion migration data used in VM mobility for VMware systems enters the CNE/LDCM device 1302 through the LAN Ethernet links of the CEE switching chip 1210 and the compressed, encrypted data is sent over the WAN infrastructure using the WAN uplink using the Ethernet ports 1206 of the SOC 1202. Similarly for storage migration, the data from the SAN FC link provided by the FC switching chip 1208 is migrated using the WAN uplink to migrate storage. The control plane module 1220 takes care of establishing, maintaining and terminating TCP sessions with the application servers and the destination LDCM servers.

Figure 8B:
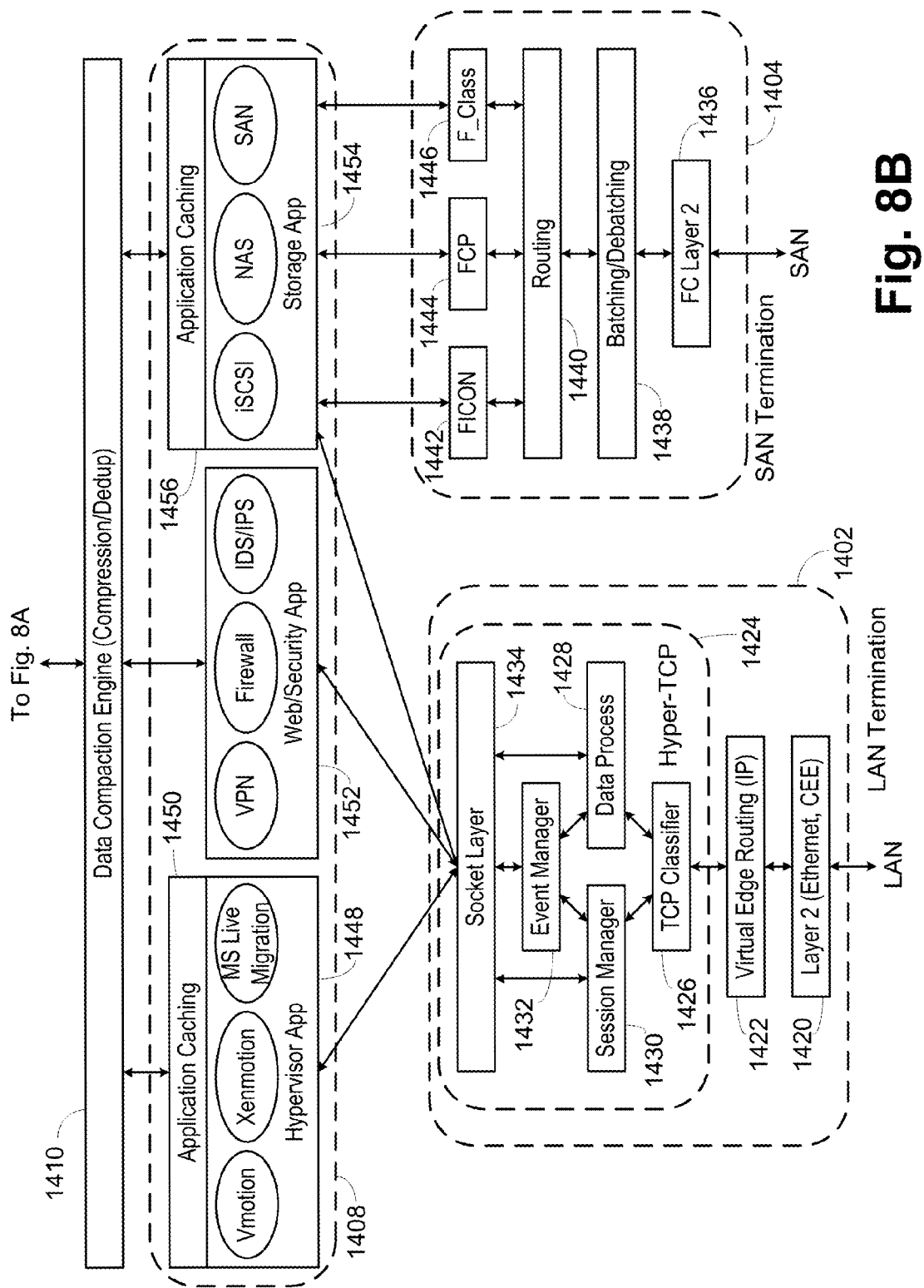

FIGS. 8A and 8B illustrate the functional blocks and modules of the CNE/LDCM device. LAN termination 1402 and SAN termination 1404 are interconnected to the CVI 1406 by an application module 1408, the data compaction engine 1410 and a high reliability delivery application (HRDA) layer 1412.

LAN termination 1402 has a layer 2, Ethernet or CEE, module 1420 connected to the LAN ports. An IP virtual edge routing module 1422 connects the layer 2 module 1420 to a Hyper-TCP module 1424. The Hyper-TCP module 1424 operation is described in more detail below and includes a TCP classifier 1426 connected to the virtual edge routing module 1422. The TCP classifier 1426 is connected to a data process module 1428 and a session manager 1430. An event manager 1432 is connected to the data process module 1428 and the session manager 1430. The event manager 1432, the data process module 1428 and the session manager 1430 are all connected to a socket layer 1434, which acts as the interface for the Hyper-TCP module 1424 and the LAN termination 1402 to the application module 1408.

SAN termination 1404 has an FC layer 2 module 1436 connected to the SAN ports. A batching/debatching module 1438 connects the FC layer 2 module 1436 to a routing module 1440. Separate modules are provided for Fibre connection (FICON) traffic 1442, FCP traffic 1444 and F_Class traffic 1446, with each module connected to the routing module 1440 and acting as interfaces between the SAN termination 1404 and the application module 1408.

The application module 1408 has three primary applications, hypervisor 1448, web/security 1452 and storage 1454. The hypervisor application 1448 cooperates with the various hypervisor motion functions, such vMotion®, Xenmotion® and MS Live Migration. A caching subsystem 1450 is provided with the hypervisor application 1448 for caching of data during the motion operations. The web/security application 1452 cooperates with virtual private networks (VPNs), firewalls and intrusion systems. The storage application 1454 handles iSCSI, network attached storage (NAS) and SAN traffic and has an accompanying cache 1456.

The application module 1408 has three primary applications, hypervisor 1448, web/security 1452 and storage 1454. The hypervisor application 1448 cooperates with the various hypervisor motion functions, such vMotion, Xenmotion and MS Live Migration. A caching subsystem 1450 is provided with the hypervisor application 1448 for caching of data during the motion operations. The web/security application 1452 cooperates with VPNs, firewalls and intrusion systems. The storage application 1454 handles iSCSI, NAS and SAN traffic and has an accompanying cache 1456.

The data compaction engine 1410 uses the compression engine 1212 to handle compression/decompression and dedup operations to allow improved efficiency of the WAN links.

The main function of the HRDA layer 1412 is to ensure the communication reliability at the network level and also at the transport level. As shown, the data centers are consolidated by extending the L2 TRILL network over IP through the WAN infrastructure. The redundant links are provisioned to act as back up paths. The HRDA layer 1412 performs a seamless switchover to the backup path in case the primary path fails. HBTCP sessions running over the primary path are prevented from experiencing any congestion event by retransmitting any unacknowledged segments over the backup path. The acknowledgements for the unacknowledged segments and the unacknowledged segments themselves are assumed to be lost. The HRDA layer 1412 also ensures reliability for TCP sessions within a single path. In case a HBTCP session fails, any migration application using the HBTCP session will also fail. In order to prevent the applications from failing, the HRDA layer 1412 transparently switches to a backup HBTCP session.

The CVI 1406 includes an IP module 1466 connected to the WAN links. An IPSEC module 1464 is provided for link security. A HBTCP module 1462 is provided to allow the HBTCP operations as described above. A quality of service (QoS)/ARL module 1460 handles the QoS and ARL functions described above. A trunk module 1458 handles the trunking described above.

Hyper-TCP is a component in accelerating the migration of live services and applications over long distance networks. Simply, a TCP session between the application client and server is locally terminated and by leveraging the high bandwidth transmission techniques between the data centers, application migration is accelerated.

Hyper-TCP primarily supports two modes of operation:

1) Data Termination Mode (DTM): In data termination mode, the end device TCP sessions are not altered but the data is locally acknowledged and data sequence integrity is maintained.

2) Complete Termination Mode (CTM): In the complete termination mode, end device TCP sessions are completely terminated by the LDCM. Data sequence is not maintained between end devices but data integrity is guaranteed.

There are primarily three phases in Hyper-TCP. They are Session Establishment, Data Transfer and Session Termination. These three phases are explained below.

1) Session Establishment: During this phase, the connection establishment packets are snooped and the TCP session data, like connection end points, Window size, MTU and sequence numbers, are cached. The Layer 2 information like the MAC addresses is also cached. The TCP session state on the Hyper-TCP server is same as that of the application server and the TCP session state of the Hyper-TCP client is same as application client. With the cached TCP state information, the Hyper-TCP devices can locally terminate the TCP connection between the application client and server and locally acknowledge the receipt of data packets. Hence, the round trip times (RTT's) calculated by the application will be masked from including the WAN latency, which results in better performance.

Figure 9:
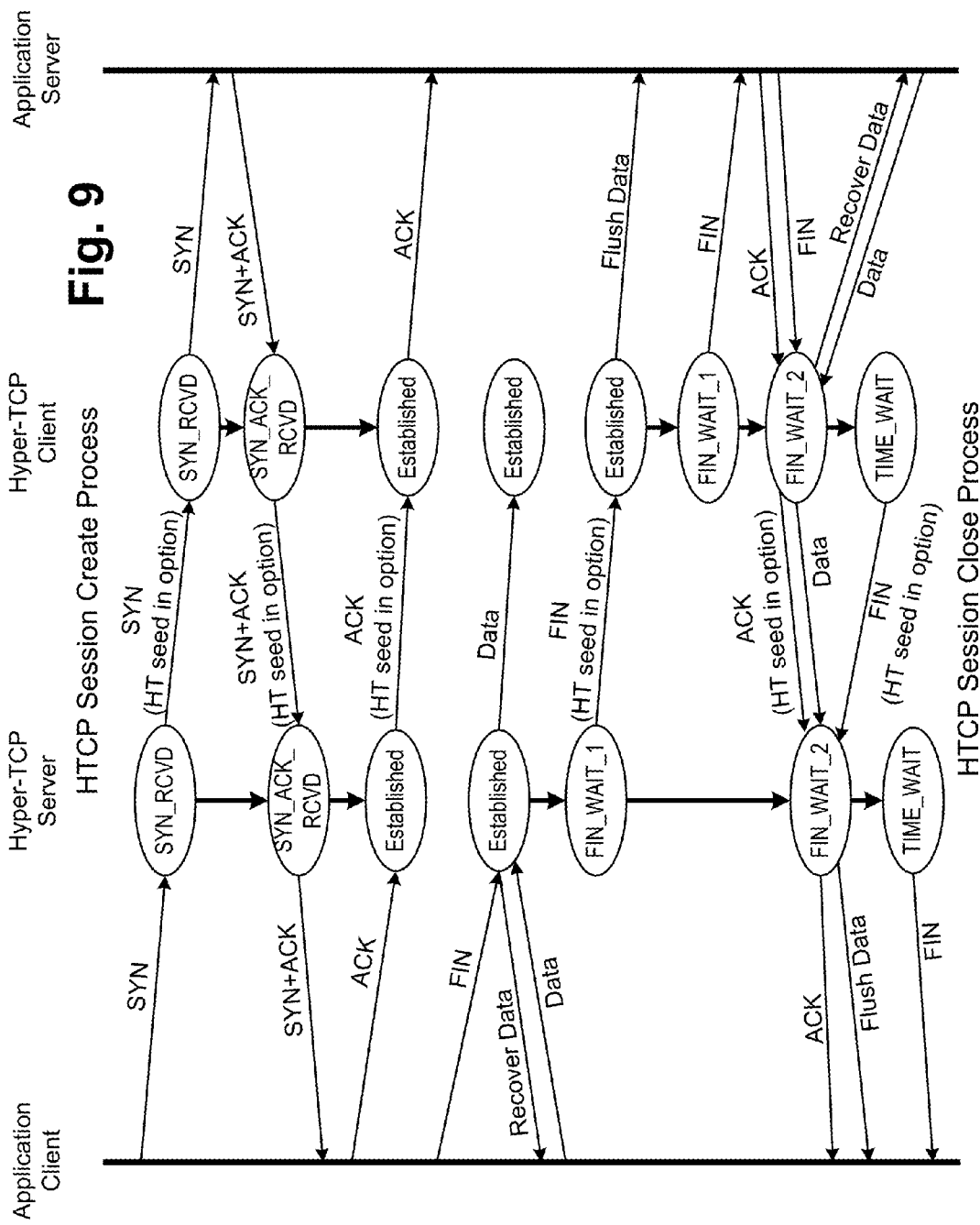
FIG. 9 is a ladder diagram of Hyper-TCP session create and close processes according to the present invention.

The session create process is illustrated in FIG. 9. The application client transmits a SYN, which is snooped by the Hyper-TCP server. The Hyper-TCP server forwards the SYN to the Hyper-TCP client, potentially with a seed value in the TCP header options field. The seed value can indicate whether this is a Hyper-TCP session, a termination mode, the Hyper-TCP version and the like. The seed value is used by the various modules, such as the data compaction engine 1410 and the CVI 1406, to determine the need for and level of acceleration of the session. The Hyper-TCP client snoops and forwards the SYN to the application server. The application server responds with a SYN+ACK, which the Hyper-TCP client snoops and forwards to the Hyper-TCP server. The Hyper-TCP server snoops the SYN+ACK and forwards it to the application client. The application client responds with an ACK, which the Hyper-TCP server forwards to the Hyper-TCP client, which in turn provides it to the application server. This results in a created TCP session.

2) Data Transfer Process: Once the session has been established, the data transfer is always locally handled between a Hyper-TCP device and the end device. A Hyper-TCP server acting as a proxy destination server for the application client locally acknowledges the data packets and the TCP session state is updated. The data is handed over to the HBTCP session between the Hyper-TCP client and server. HBTCP session compresses and forwards the data to the Hyper-TCP client. This reduces the RTT's seen by the application client and the source as it masks the latencies incurred on the network. The data received at the Hyper-TCP client is treated as if the data has been generated by the Hyper-TCP client and the data is handed to the Hyper-TCP process running between the Hyper-TCP client and the application server. Upon congestion in the network, the amount of data fetched from the Hyper-TCP sockets is controlled.

Figure 10:
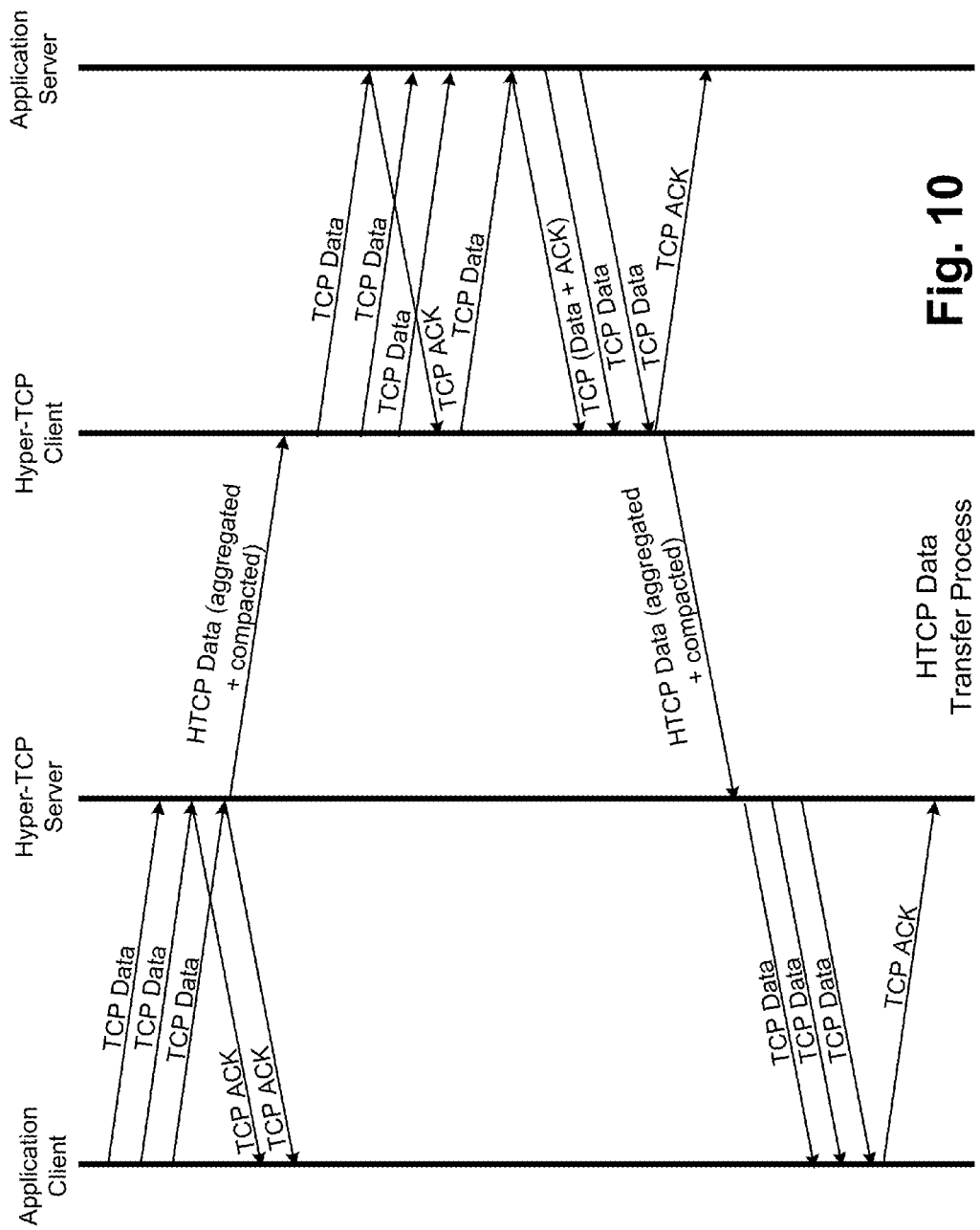
FIG. 10 is a ladder diagram of Hyper-TCP data transfer operations according to the present invention.

This process is illustrated in FIG. 10. Data is provided from the application client to the Hyper-TCP server, with the Hyper-TCP server ACKing the data as desired, thus terminating the connection locally at the Hyper-TCP server. The LDCM device aggregates and compacts the received data to reduce WAN traffic and sends it to the Hyper-TCP client in the other LDCM device. The receiving LDCM device uncompacts and deaggregates the data and provides it to the Hyper-TCP client, which in turn provides it to the application server, which periodically ACKs the data. Should the application server need to send data to the application client, the process is essentially reversed. By having the Hyper-TCP server and client locally respond to the received data, thus locally terminating the connections, the application server and client are not aware of the delays resulting from the WAN link between the Hyper-TCP server and client.

3) Session Termination: A received FIN/RST is transparently sent across like the session establishment packets. This is done to ensure the data integrity and consistency between the two end devices. The FIN/RST received at the Hyper-TCP server will be transparently sent across only when all the packets received prior to receiving a FIN have been locally acknowledged and sent to the Hyper-TCP client. If a FIN/RST packet has been received on the Hyper-TCP client, the packet will be transparently forwarded after all the enqueued data has been sent and acknowledged by the application server. In either direction, once the FIN has been received and forwarded, the further transfer of packets is done transparently and is not locally terminated.

This is shown in more detail in FIG. 9. The application client provides a FIN to the Hyper-TCP server. If any data has not been received by the Hyper-TCP server, the Hyper-TCP server will recover the data from the application client and provide it to the Hyper-TCP client. The Hyper-TCP server then forwards the FIN to the Hyper-TCP client, which flushes any remaining data in the Hyper-TCP client and then forwards the FIN to the application server. The application server replies with an ACK for the flushed data and then a FIN. The Hyper-TCP client then receives any outstanding data from the application server and recovers data to the application server. The ACK and the data are forwarded to the Hyper-TCP server. After the data is transferred, the Hyper-TCP client forwards the FIN to the Hyper-TCP server. The Hyper-TCP server forwards the ACK when received and flushes any remaining data to the application client. After those are complete, the Hyper-TCP server forwards the FIN and the session is closed.

Figure 11:
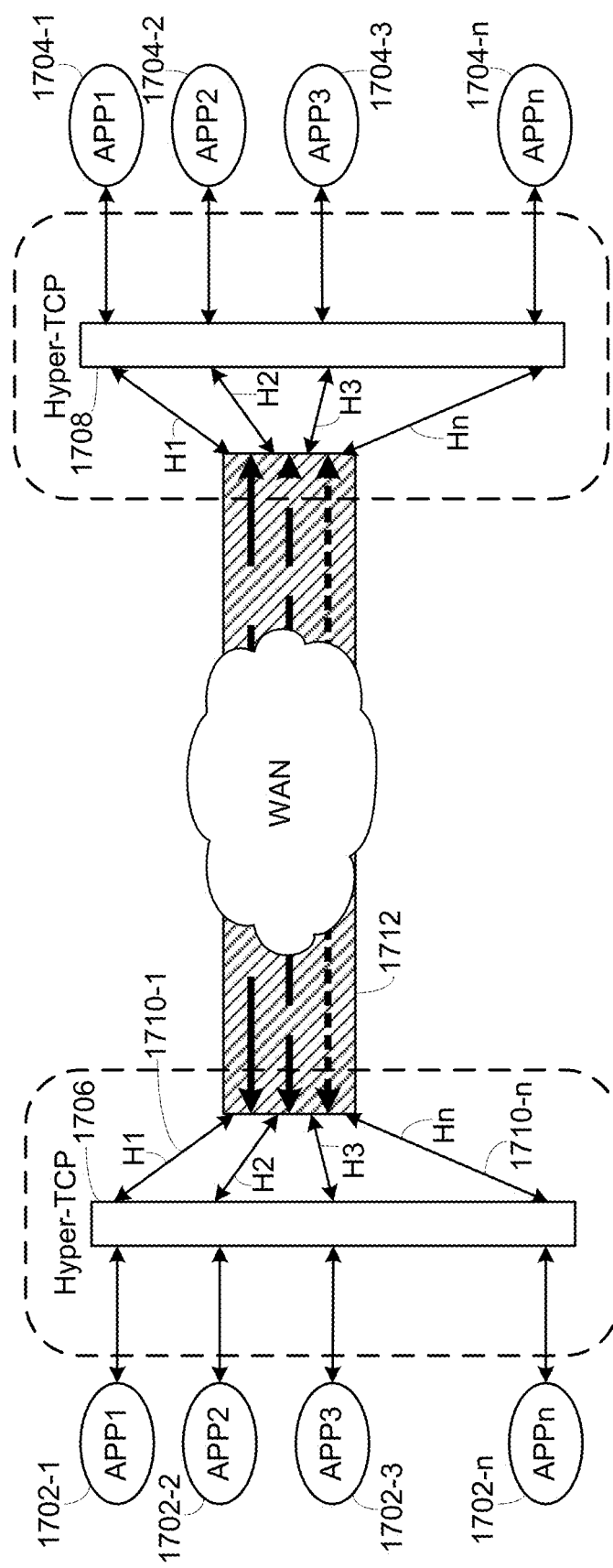
FIG. 11 is a block diagram illustrating the operation of Hyper-TCP according to the present invention.

FIG. 11 illustrates the effective operation of the Hyper-TCP server and client over the CVI 1712. A series of applications 1702-1 to 1702-*n* are communicating with applications 1704-1 to 1704-*n*, respectively. The Hyper-TCP server agent 1706 cooperates with the applications 1702 while the Hyper-TCP agent 1708 cooperates with the applications 1704. In the illustration, four different Hyper-TCP sessions are shown, H1, H2, H3 and Hn 1710-1 to 1710-*n*, which traverse the WAN using the CVI 1712.

Figure 12:
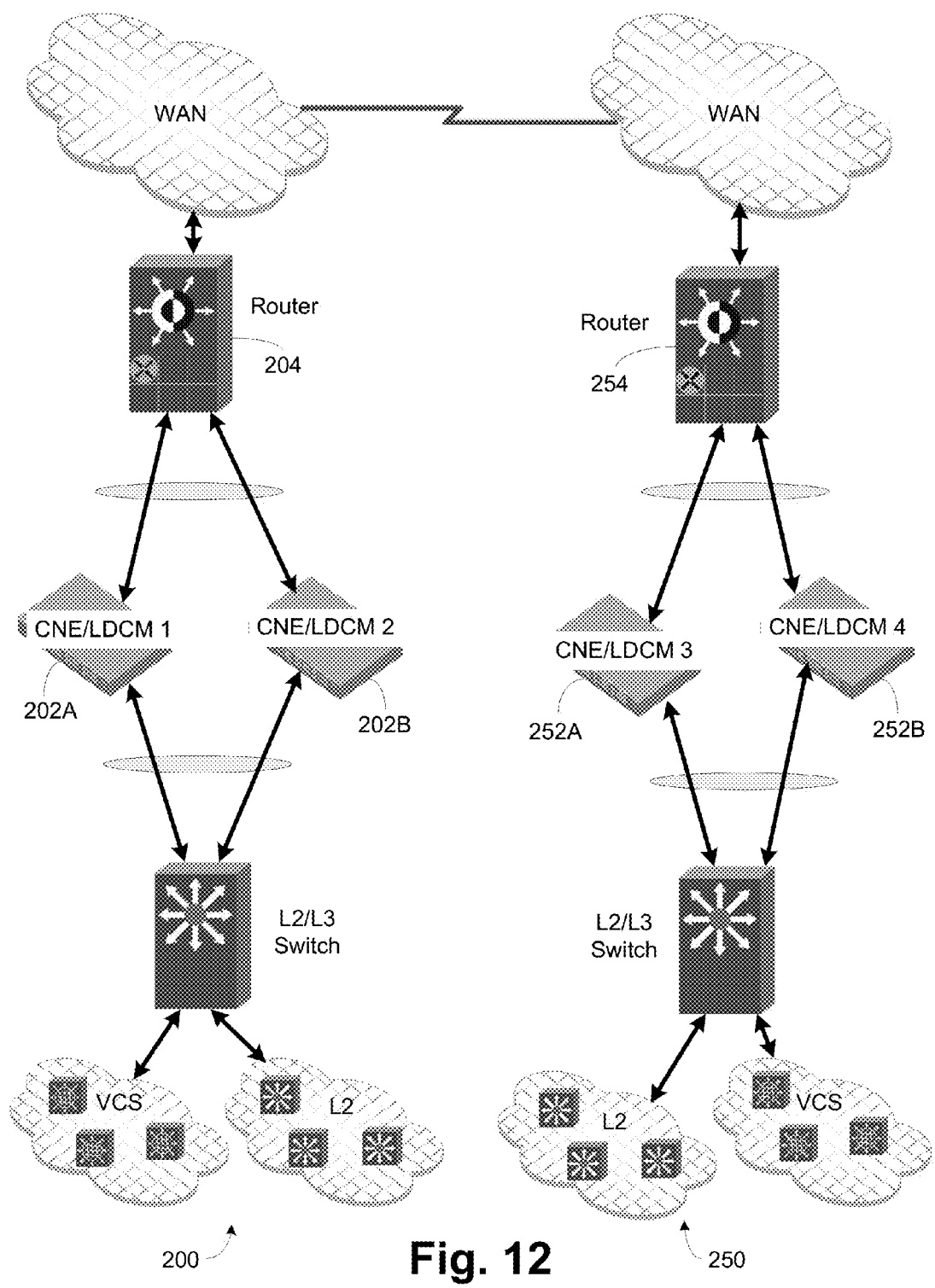
FIG. 12 is a block diagram of an HA configuration according to the present invention.

FIG. 12 illustrates a basic high availability (HA) configuration for the CNE/LDCM devices. Each data center 200, 250 includes two paralleled CNE/LDCM devices 202A, 202B, 252A, 252B, with load balancers/routers 204, 254 connecting the data centers 200, 250.

Figure 13:
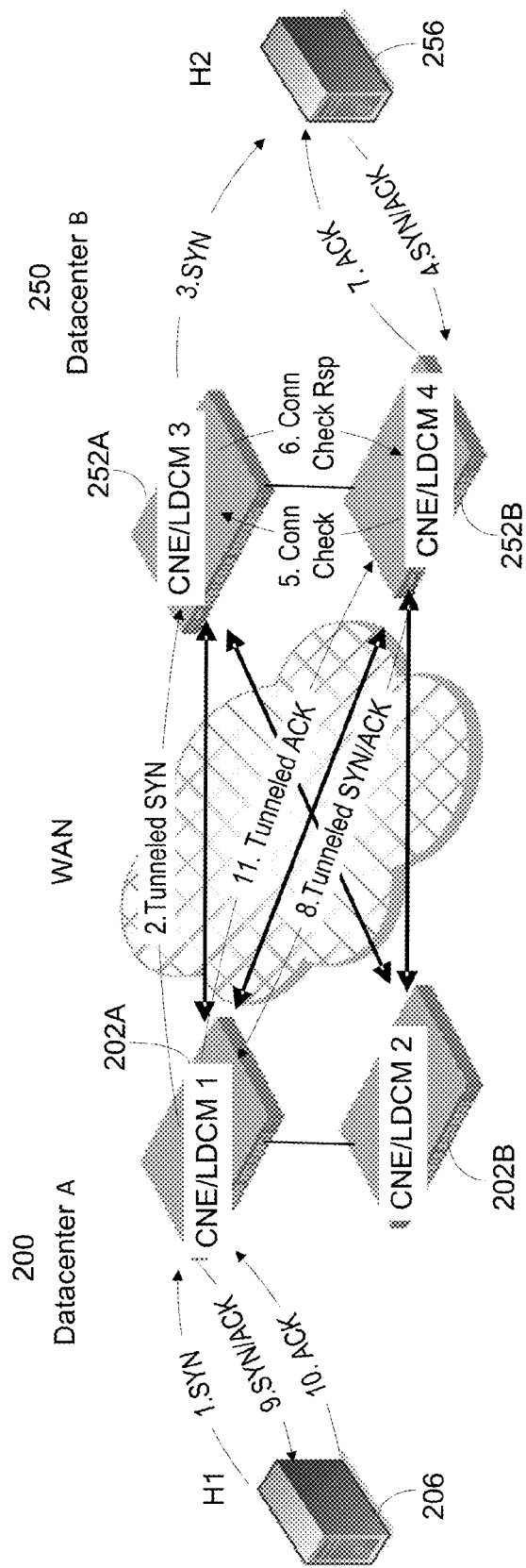
FIG. 13 is a block diagram illustrating TCP connection movement at setup time according to one embodiment of the present invention.

To address the problems described in the background, in systems according to the present invention the TCP connections are moved from one CNE/LDCM device (CNE/LDCM 3 252A) to another CNE/LDCM device at the same site (CNE/LDCM 4 252B). The steps to do that can be summarized as follows and as shown in FIG. 13:

1. Host H1 206 sends SYN request to CNE/LDCM1 202A
   a. CNE/LDCM1 202A creates local LAN side TCP connection
   b. CNE/LDCM1 202A LAN TCP manager forwards SYN to the LAN state machine
2. CNE/LDCM1 202A selects a tunnel and sends tunneled SYN to CNE/LDCM3 252A
3. CNE/LDCM3 252A sends SYN to H2 256
   a. CNE/LDCM3 252A creates local LAN TCP connection
4. Host H2 256 sends SYN/ACK to CNE/LDCM4 252B
5. CNE/LDCM4 252B does not know about this connection so it sends connection check request to CNE/LDCM3 252A
6. CNE/LDCM3 252A sends connection check response to CNE/LDCM4 252B
   a. CNE/LDCM3 252A deletes local LAN TCP connection as connection will be on CNE/LDCM4 252B
   b. CNE/LDCM4 252B creates local LAN TCP connection
7. CNE/LDCM4 252B sends ACK for SYN/ACK to H2 256, fully establishing the TCP connection on CNE/LDCM4 252B

8. CNE/LDCM4 252B then sends the tunneled SYN/ACK to CNE/LDCM1 202A

9. CNE/LDCM1 202A sends SYN/ACK to H1 206

10. H1 206 sends ACK to CNE/LDCM1 202A, fully establishing the TCP connection on CNE/LDCM1 202A 11. CNE/LDCM1 202A sends ACK over the tunnel to CNE/LDCM4 252B (previously the tunneled SYN-ACK came from CNE/LDCM4 252B).

In this case the client side connection would be between H1-CNE/LDCM1 206-202A, the server side between CNE/LDCM4-H2 252B-265 and then the tunnel used would be CNE/LDCM1-CNE/LDCM4 202A-252B.

In an alternate embodiment, CNE/LDCM3 252A can send a notification to CNE/LDCM4 252B when it receives the SYN as shown in step 3 and CNE/LDCM4 252B Can send an ownership transfer message to CNE/LDCM3 252A when CNE/LDCM4 252B receives the SYN/ACK without sending the SYN for it, instead of the exchange of steps 5 and 6.

In another alternate embodiment, the ACK that is sent in step 11 can be sent after receiving the SYN/ACK in step 4.

Figure 14:
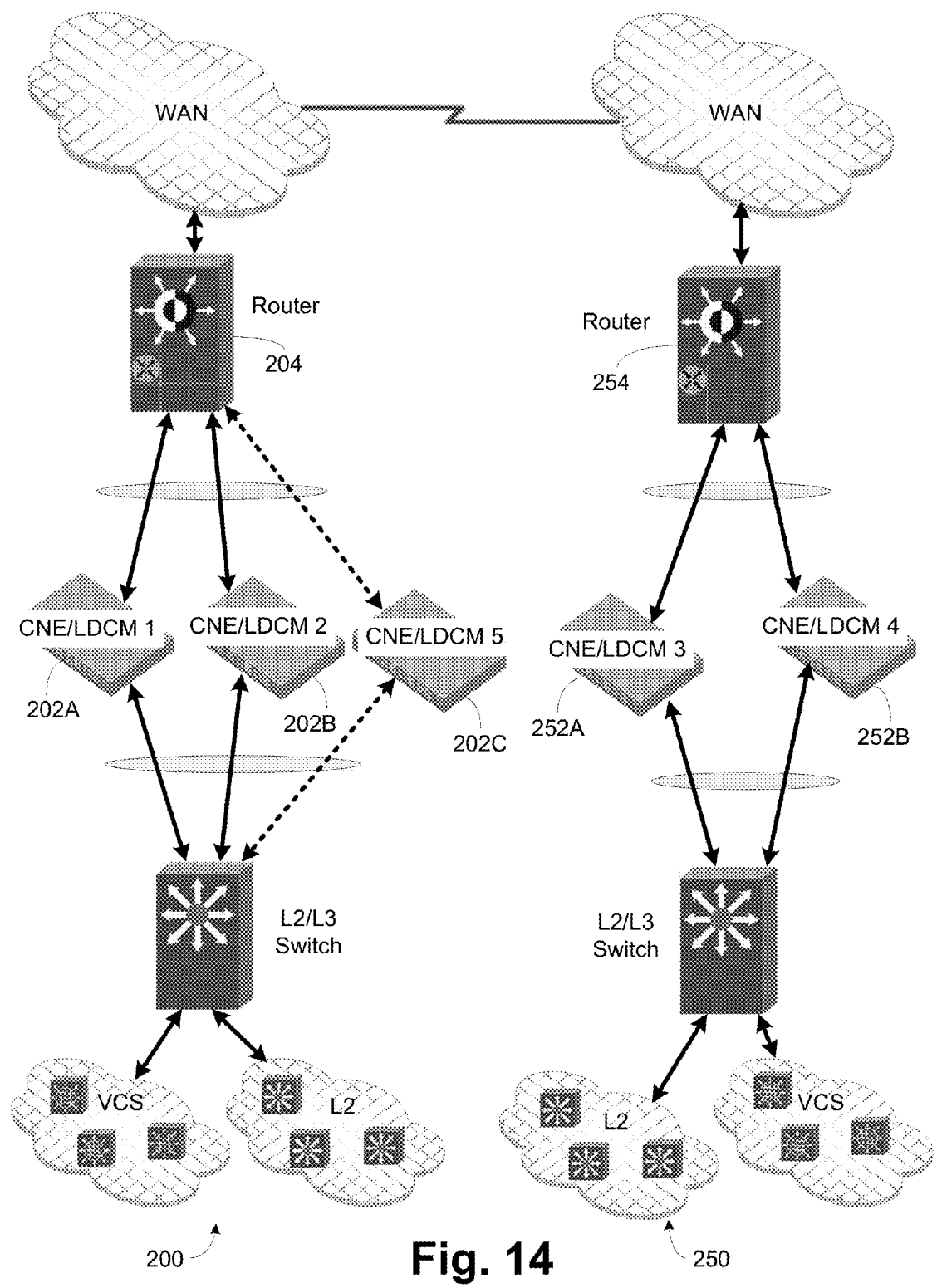
FIG. 14 is the block diagram of FIG. 12 with an additional CNE/LDCM device in one data center.

Moving TCP connections in the setup stage as discussed above is useful to fix asymmetric traffic flow in the network but does not cover the case when a device is added after the connection is established or the case when a device reboots and comes online after a connection is already established to the other device, as shown in FIG. 14. After a device is added the packets for an already existing connection may start going to the new device. The new device does not have any information about these connections. All information about this connection is with the old device. One way to solve this problem is to forward the data from the new device to the old device. This solution adds load to the two devices and increases the bandwidth requirements between the devices.

Figure 15:
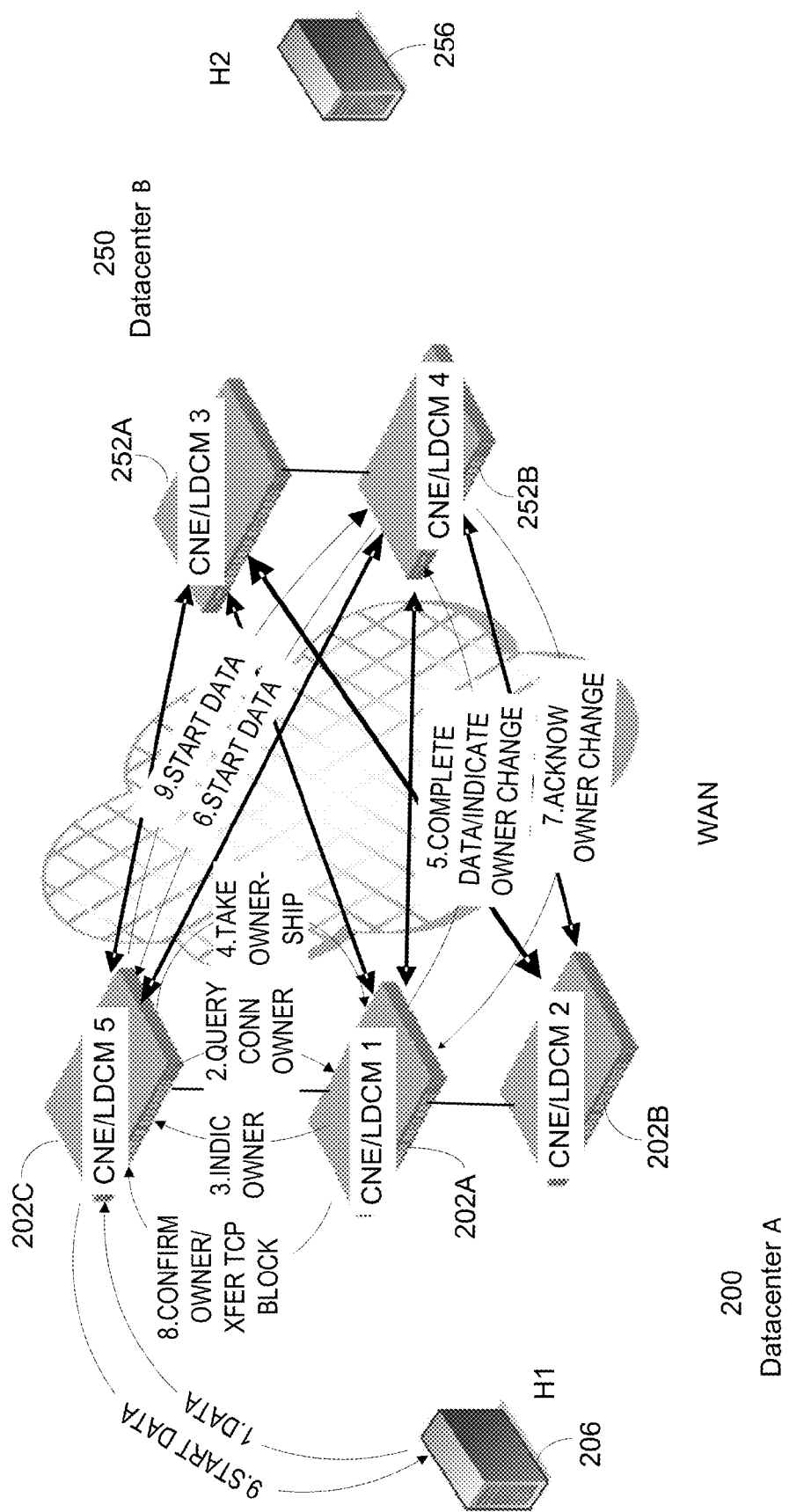
FIG. 15 is a block diagram illustrating TCP connection movement during active operation according to one embodiment of the present invention.

In the above example of FIG. 12, if after the TCP connection is established, the customer added CNE/LDCM5 202C in the same site as CNE/LDCM1 202A and CNE/LDCM2 202B. This sequence of events may happen, as also illustrated in FIG. 15.

1. The router 204 reacts to having another CNE/LDCM device and it may forward the data frame for this connection to CNE/LDCM5 202C instead of CNE/LDCM1 202A.

2. CNE/LDCM5 202C does not have any information about this connection but it knows that these data is for an already established connection that it does not own. It will query existing CNE/LDCM1 202A and CNE/LDCM2 202B devices to get information about this connection. In an alternate embodiment this information can also be pushed by other CNE/LDCM devices when CNE/LDCM5 202C comes online).

3. CNE/LDCM1 202A responds it is the connection owner to CNE/LDCM5 202C

4. CNE/LDCM5 202C informs the connection owner (CNE/LDCM1 202A) that CNE/LDCM5 202C will be the new owner for this connection. CNE/LDCM5 202C sends a request for CNE/LDCM1 202A to flush all outstanding data that were acknowledged and send them to remote site. The data that was now acknowledged can be flushed or dropped. If CNE/LDCM1 202A chooses to drop the data, normal TCP operation will recover this data.

5. CNE/LDCM1 202A is required to flush the data in both directions. CNE/LDCM1 202A knows it will not receive any more data from the local site because CNE/LDCM5 202C is now the new owner for this connection but it still can receives data from the remote site. CNE/LDCM1 202A sends all the data it has queued in the receive queue from the local client and sends a notification to the remote site that it is done sending all the data it has for this connection. CNE/LDCM1 202A also sends a request to CNE/LDCM4 252B indicating that CNE/LDCM5 202C is the new owner for this connection and the communication for this connection should be between CNE/LDCM4 252B and CNE/LDCM5 202C.

6. After CNE/LDCM4 252B gets the switch owner request from CNE/LDCM1 202A it starts sending all data related to this connection to CNE/LDCM5 202C. At this time CNE/LDCM5 202C is buffering this connection. It is buffering from LAN and WAN side. It does not send any frames to the client. It also does not send any frames to CNE/LDCM4 252B.

7. After CNE/LDCM4 252B updates its table to send data for this connection to CNE/LDCM5 202C, it sends acknowledge to CNE/LDCM1 202A that changing the owner is done. At this point CNE/LDCM1 202A knows that it will not receive any data to this connection from the LAN or the WAN. Also at this point CNE/LDCM1 202A has already flushed all the data for this connection.

8. Now CNE/LDCM1 202A can confirm to CNE/LDCM5 202C that this connection is already moved and CNE/LDCM5 202C is now the owner. CNE/LDCM1 202A sends a copy of the TCP control block to CNE/LDCM5 202C.

9. CNE/LDCM5 202C starts processing all the buffered frames from the WAN and from the LAN based on the TCP connection control block it received from CNE/LDCM1 202A. It is better to buffer the frames in CNE/LDCM5 202C as frames without going through the TCP stack and we go through the TCP stack only after CNE/LDCM1 202A acknowledges that the connection is moved. Before that time CNE/LDCM5 202C does not have correct information for the TCP control block.

Alternatively, this can be understood as follows:

1. LAN state machine (LSM) closes the window on existing TCP connection.

2. The TCP connection sends an ACK with a zero for a receive window, essentially closing down the connection to the client 3. LSM queries the following from the existing TCP connection:
   a. TCP State
   b. Current TCP Sequence number
   c. Current TCP ACK Number
   d. Window Size
   e. TCP Port numbers 4. LSM passes the TCP connection information to the TCP manager 5. TCP manager sends information to CNE/LDCM that is taking over 6. TCP manager on new CNE/LDCM sends connection information to LSM 7. LSM creates TCP connection By passing control of TCP sessions between CNE/LDCM devices in a datacenter, TCP connections can be moved around to compensate for load balancing traffic changes, either at setup or during operation. This allows better load sharing of connections across WAN and other networks subject to traffic rerouting.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:
    initiating a Transmission Control Protocol (TCP) connection using a first of a plurality of paralleled network devices at a first location and a first of a plurality of paralleled network devices at a second location, the first of the plurality of paralleled network devices at the first location acting as a local termination for the TCP connection;
    receiving a TCP transmission related to the TCP connection at a second of the plurality of paralleled network devices at the first location; and
    transferring the TCP connection from the first of the plurality of paralleled network devices at the first location to the second of the plurality of paralleled network devices at the first location in response to the receipt of the TCP transmission so that the second of the plurality of paralleled network devices at the first location can act as the local termination for the TCP connection.

2. The method of claim 1, wherein the received TCP transmission is a SYN/ACK, and
    wherein the step of transferring includes:
        transferring a connection ownership request between the second of the plurality of paralleled network devices at the first location and the first of the plurality of paralleled network devices at the first location for ownership of the TCP connection in response to the receipt of the TCP transmission; and
        transferring a check response indicating transfer of ownership of the TCP connection between the first of the plurality of paralleled network devices at the first location and the second of the plurality of paralleled network devices at the first location.

3. The method of claim 1, wherein the received TCP transmission is a SYN/ACK, and
    wherein step of transferring includes:
        transferring a SYN received message between the first of the plurality of paralleled network devices at the first location and the second of the plurality of paralleled network devices at the first location when a SYN is received by the first of the plurality of paralleled network devices at the first location; and
        transferring an ownership transfer message between the first of the plurality of paralleled network devices at the first location and the second of the plurality of paralleled network devices at the first location in response to the receipt of the TCP transmission.

4. The method of claim 1, wherein the received TCP transmission is a portion of a data transfer, and
    wherein the step of transferring includes:
        transferring a connection ownership request between the second of the plurality of paralleled network devices at the first location and the first of the plurality of paralleled network devices at the first location for ownership of the TCP connection in response to the receipt of the TCP transmission;
        transferring an ownership response indicating ownership of the TCP connection between the first of the plurality of paralleled network devices at the first location and the second of the plurality of paralleled network devices at the first location in response to the connection ownership request;
        transferring an ownership transfer request for the TCP connection between the first of the plurality of paralleled network devices at the first location and the second of the plurality of paralleled network devices at the first location in response to the ownership response;
        transferring an ownership transfer indication between the first of the plurality of paralleled network devices at the first location and the first of the plurality of paralleled network devices at the second location in response to the ownership transfer request;
        transferring an ownership change acknowledgement between the first of the plurality of paralleled network devices at the second location and the first of the plurality of paralleled network devices at the first location in response to the ownership transfer indication; and
        transferring an ownership transfer confirmation between the first of the plurality of paralleled network devices at the first location and the second of the plurality of paralleled network devices at the first location in response to the ownership change acknowledgement.

5. A method comprising:
    initiating, using a first of a plurality of paralleled network devices at a first location and a first of a plurality of paralleled network devices at a second location, a Transmission Control Protocol (TCP) connection, the first of the plurality of paralleled network devices at the first location acting as a local termination for the TCP connection; and
    transferring the TCP connection using the first of the plurality of paralleled network devices at the first location in response to receipt of a TCP transmission related to the TCP connection by a second of the plurality of paralleled network devices at the first location so that the second of the plurality of paralleled network devices at the first location can act as the local termination for the TCP connection.

6. The method of claim 5, wherein the received TCP transmission is a SYN/ACK, and
    wherein the step of transferring includes:
        receiving at the first of the plurality of paralleled network devices at the first location a connection ownership request for ownership of the TCP connection in response to the receipt of the TCP transmission; and
        transmitting a check response indicating transfer of ownership of the TCP connection from the first of the plurality of paralleled network devices at the first location.

7. The method of claim 5, wherein the received TCP transmission is a SYN/ACK, and
    wherein step of transferring includes:
        transmitting a SYN received message from the first of the plurality of paralleled network devices at the first location when a SYN is received by the first of the plurality of paralleled network devices at the first location; and
        receiving an ownership transfer message at the first of the plurality of paralleled network devices at the first location in response to the receipt of the TCP transmission.

8. The method of claim 5, wherein the received TCP transmission is a portion of a data transfer, and
    wherein the step of transferring includes:

receiving a connection ownership request at the first of the plurality of paralleled network devices at the first location for ownership of the TCP connection in response to the receipt of the TCP transmission;

transmitting an ownership response indicating ownership of the TCP connection from the first of the plurality of paralleled network devices at the first location in response to the connection ownership request;

receiving an ownership transfer request for the TCP connection at the first of the plurality of paralleled network devices at the first location in response to the ownership response;

transmitting an ownership transfer indication from the first of the plurality of paralleled network devices at the first location to a first of the plurality of paralleled network devices at the second location in response to the ownership transfer request;

receiving an ownership change acknowledgement at the first of the plurality of paralleled network devices at the first location from the first of the plurality of paralleled network devices at the second location in response to the ownership transfer indication; and transmitting an ownership transfer confirmation from the first of the plurality of paralleled network devices at the first location in response to the ownership change acknowledgement.

9. A method comprising:

receiving at a second of a plurality of paralleled network devices at a first location a Transmission Control Protocol (TCP) transmission related to a TCP connection using a first of the plurality of paralleled network devices at the first location and a first of a plurality of paralleled network devices at a second location, the first of the plurality of paralleled network devices at the first location initially acting as a local termination for the TCP connection; and receiving the TCP connection at the second of the plurality of paralleled network devices at the first location in response to the receipt of the TCP transmission so that the second of the plurality of paralleled network devices at the first location can act as the local termination for the TCP connection.

10. The method of claim 9, wherein the received TCP transmission is a SYN/ACK, and wherein the step of transferring includes:

transmitting a connection ownership request for ownership of the TCP connection from the second of the plurality of paralleled network devices at the first location in response to the receipt of the TCP transmission; and receiving a check response indicating transfer of ownership of the TCP connection to the second of the plurality of paralleled network devices at the first location.

11. The method of claim 9, wherein the received TCP transmission is a SYN/ACK, and wherein step of transferring includes:

receiving a SYN received message at the second of the plurality of paralleled network devices at the first location when a SYN is received by the first of the plurality of paralleled network devices at the first location; and transmitting an ownership transfer message from the second of the plurality of paralleled network devices at the first location in response to the receipt of the TCP transmission.

12. The method of claim 9, wherein the received TCP transmission is a portion of a data transfer, and wherein the step of transferring includes:

transmitting a connection ownership request for ownership of the TCP connection from the second of the plurality of paralleled network devices at the first location in response to the receipt of the TCP transmission;

receiving an ownership response indicating ownership of the TCP connection at the second of the plurality of paralleled network devices at the first location in response to the connection ownership request;

transmitting an ownership transfer request for the TCP connection from the second of the plurality of paralleled network devices at the first location in response to the ownership response; and receiving an ownership transfer confirmation at the second of the plurality of paralleled network devices at the first location in response to an ownership change acknowledgement from the first of the plurality of paralleled network devices at the second location.

13. A network comprising:

a plurality of paralleled network devices at a first location; and a plurality of paralleled network devices at a second location coupled to said plurality of paralleled network devices at a first location;

wherein a first of said plurality of paralleled network devices at said first location and a first of said plurality of paralleled network devices at said second location initiate a Transmission Control Protocol (TCP) connection, the first of the plurality of paralleled network devices at the first location acting as a local termination for the TCP connection;

wherein a second of said plurality of paralleled network devices at said first location receives a TCP transmission related to said TCP connection; and wherein said first of said plurality of paralleled network devices at said first location transfers said TCP connection to said second of said plurality of paralleled network devices at said first location in response to said receipt of said TCP transmission so that the second of the plurality of paralleled network devices at the first location can act as the local termination for the TCP connection.

14. The network of claim 13, wherein said received TCP transmission is a SYN/ACK, and wherein transferring said TCP connection includes:

transferring a connection ownership request between said second of said plurality of paralleled network devices at said first location and said first of said plurality of paralleled network devices at said first location for ownership of said TCP connection in response to said receipt of said TCP transmission; and transferring a check response indicating transfer of ownership of said TCP connection between said first of said plurality of paralleled network devices at said first location and said second of said plurality of paralleled network devices at said first location.

15. The network of claim 13, wherein said received TCP transmission is a SYN/ACK, and wherein transferring said TCP connection includes:

transferring a SYN received message between said first of said plurality of paralleled network devices at said first location and said second of said plurality of paralleled network devices at said first location when a SYN is received by said first of said plurality of paralleled network devices at said first location; and transferring an ownership transfer message between said first of said plurality of paralleled network devices at said first location and said second of said plurality of paralleled network devices at said first location in response to said receipt of the TCP transmission.

16. The network of claim 13, wherein said received TCP transmission is a portion of a data transfer, and wherein transferring said TCP connection includes:

transferring a connection ownership request between said second of said plurality of paralleled network devices at said first location and said first of said plurality of paralleled network devices at said first location for ownership of said TCP connection in response to said receipt of said TCP transmission;

transferring an ownership response indicating ownership of said TCP connection between said first of said plurality of paralleled network devices at said first location and said second of said plurality of paralleled network devices at said first location in response to said connection ownership request;

transferring an ownership transfer request for said TCP connection between said first of said plurality of paralleled network devices at said first location and said second of said plurality of paralleled network devices at said first location in response to said ownership response;

transferring an ownership transfer indication between said first of said plurality of paralleled network devices at said first location and said first of said plurality of paralleled network devices at said second location in response to said ownership transfer request;

transferring an ownership change acknowledgement between said first of said plurality of paralleled network devices at said second location and said first of said plurality of paralleled network devices at said first location in response to said ownership transfer indication; and transferring an ownership transfer confirmation between said first of said plurality of paralleled network devices at said first location and said second of said plurality of paralleled network devices at said first location in response to said ownership change acknowledgement.

17. A network device that is a first of a plurality of paralleled network devices at a first location, the network device comprising:

a plurality of network ports for coupling to a second of the plurality of paralleled network devices at the first location and to a first of a plurality of paralleled network devices at a second location;

a processor coupled to said plurality of network ports; and a memory coupled to said processor and storing software which causes said processor to:

initiate a Transmission Control Protocol (TCP) connection in conjunction with the first of the plurality of paralleled network devices at the second location and act as a local termination for the TCP connection; and transfer the TCP connection in response to the receipt of a TCP transmission related to the TCP connection by the second of the plurality of paralleled network devices at the first location so that the second of the plurality of paralleled network devices at the first location can act as the local termination for the TCP connection.

18. The network device of claim 17, wherein the received TCP transmission is a SYN/ACK, and wherein the step of transferring includes:

receiving a connection ownership request for ownership of the TCP connection in response to the receipt of the TCP transmission; and transmitting a check response indicating transfer of ownership of the TCP connection.

19. The network device of claim 17, wherein the received TCP transmission is a SYN/ACK, and wherein step of transferring includes:

transmitting a SYN received message when a SYN is received by the first of the plurality of paralleled network devices at the first location; and receiving an ownership transfer message in response to the receipt of the TCP transmission.

20. The network device of claim 17, wherein the received TCP transmission is a portion of a data transfer, and wherein the step of transferring includes:

receiving a connection ownership request for ownership of the TCP connection in response to the receipt of the TCP transmission;

transmitting an ownership response indicating ownership of the TCP connection in response to the connection ownership request;

receiving an ownership transfer request for the TCP connection in response to the ownership response;

transmitting an ownership transfer indication in response to the ownership transfer request;

receiving an ownership change acknowledgement in response to the ownership transfer indication; and transmitting an ownership transfer confirmation in response to the ownership change acknowledgement.

21. A network device that is a second of a plurality of paralleled network devices at a first location, the network device comprising:

a plurality of network ports for coupling to a first of the plurality of paralleled network devices at the first location and to a first of a plurality of paralleled network devices at a second location;

a processor coupled to said plurality of network ports; and a memory coupled to said processor and storing software which causes said processor to:

receive a Transmission Control Protocol (TCP) transmission related to a TCP connection between the first of the plurality of paralleled network devices at a first location and the first of a plurality of paralleled network devices at a second location, the first of the plurality of paralleled network devices at the first location acting as a local termination for the TCP connection; and receive the TCP connection in response to the receipt of the TCP transmission so that the second of the plurality of paralleled network devices at the first location can act as the local termination for the TCP connection.

22. The network device of claim 21, wherein the received TCP transmission is a SYN/ACK, and wherein the step of transferring includes:

transmitting a connection ownership request for ownership of the TCP connection in response to the receipt of the TCP transmission; and receiving a check response indicating transfer of ownership of the TCP connection.

23. The network device of claim 21, wherein the received TCP transmission is a SYN/ACK, and
   wherein step of transferring includes:
   receiving a SYN received message when a SYN is received by the first of the plurality of paralleled network devices at the first location; and
   transmitting an ownership transfer message in response to the receipt of the TCP transmission.

24. The network device of claim 21, wherein the received TCP transmission is a portion of a data transfer, and
   wherein the step of transferring includes:
   transmitting a connection ownership request for ownership of the TCP connection in response to the receipt of the TCP transmission;
   receiving an ownership response indicating ownership of the TCP connection in response to the connection ownership request;
   transmitting an ownership transfer request for the TCP connection in response to the ownership response; and
   receiving an ownership transfer confirmation in response to an ownership change acknowledgement from the first of the plurality of paralleled network devices at the second location.

* * * * *